US012812195B2

(12) United States Patent
Webb et al.

(10) Patent No.: US 12,812,195 B2
(45) Date of Patent: *Nov. 24, 2026

(54) SYSTEM AND METHOD FOR GENERATING A LIVE OUTPUT STREAM MANIFEST BASED ON AN EVENT

(71) Applicant: Turner Broadcasting System, Inc., Atlanta, GA (US)

(72) Inventors: Nicolas Paul Webb, McDonough, GA (US); Nishith Kumar Sinha, Mableton, GA (US)

(73) Assignee: Turner Broadcasting System, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/058,419

(22) Filed: Feb. 20, 2025

(65) Prior Publication Data

US 2025/0193470 A1 Jun. 12, 2025

Related U.S. Application Data

(63) Continuation of application No. 17/742,528, filed on May 12, 2022, now Pat. No. 12,244,883.

(51) Int. Cl.
*H04N 21/262* (2011.01)
*H04N 21/2187* (2011.01)
(Continued)

(52) U.S. Cl.
CPC ... *H04N 21/26258* (2013.01); *H04N 21/2187* (2013.01); *H04N 21/2393* (2013.01); *H04N 21/2668* (2013.01)

(58) Field of Classification Search
CPC ......... H04N 21/26258; H04N 21/2187; H04N 21/2393; H04N 21/2668
(Continued)

(56) References Cited

U.S. PATENT DOCUMENTS 10,652,594 B2 * 5/2020 Chen ....................... H04L 65/70
2013/0064283 A1 * 3/2013 Sun .................. H04N 21/23439 375/E7.026
(Continued)

OTHER PUBLICATIONS

Final Rejection Mailed on Jan. 5, 2024 for U.S. Appl. No. 17/742,528, 38 page(s).
(Continued)

*Primary Examiner* — Alfonso Castro
(74) *Attorney, Agent, or Firm* — Haynes and Boone, LLP

(57) ABSTRACT

A system is provided for generating a live output stream manifest based on an event. Each of a set of discrete service engines ingest a portion of a programming schedule comprising a playlist of media content. Based on processing of source manifests encapsulated by the media content, a collection of disparate manifest units is obtained. The collection of disparate manifest units is stored as indexed disparate manifest units in a data store based on a set of indexing parameters. Based on an event including a set of indexed disparate manifest units retrieved from the data store, a live output stream manifest is generated during a current iteration in response to a client request comprising a set of client request parameters. The retrieval of the set of indexed disparate manifest units is performed just-in-time based on a query that corresponds to the set of client request parameters.

12 Claims, 12 Drawing Sheets

(51) Int. Cl.
*H04N 21/239* (2011.01)
*H04N 21/2668* (2011.01)

(58) Field of Classification Search
USPC .......................................................... 725/116
See application file for complete search history.

(56) References Cited

U.S. PATENT DOCUMENTS

| | | | | |
|---|---|---|---|---|
| 2014/0229529 | A1* | 8/2014 | Barone | H04L 65/103 709/203 |
| 2014/0282723 | A1* | 9/2014 | Sinha | H04H 60/37 725/35 |
| 2014/0351385 | A1* | 11/2014 | Li | H04N 21/8456 709/219 |
| 2015/0294025 | A1* | 10/2015 | Wellen | H04H 20/93 715/202 |
| 2018/0359328 | A1* | 12/2018 | Fablet | H04L 67/02 |
| 2019/0098066 | A1* | 3/2019 | Nielsen | H04L 65/765 |
| 2023/0217086 | A1* | 7/2023 | Beilis-Lev | H04N 21/262 725/109 |

OTHER PUBLICATIONS

Non-Final Rejection Mailed on Jun. 23, 2023 for U.S. Appl. No. 17/742,528, 31 page(s).
Non-Final Rejection Mailed on Mar. 28, 2024 for U.S. Appl. No. 17/742,528, 24 page(s).

* cited by examiner

SYSTEM AND METHOD FOR GENERATING A LIVE OUTPUT STREAM MANIFEST BASED ON AN EVENT

CROSS-REFERENCE TO RELATED APPLICATIONS

This application claims priority to U.S. Non-Provisional application Ser. No. 17/742,528 entitled System and Method for Generating A Live Output Stream Manifest Based On An Event, filed May 12, 2022, the entirety of which is incorporated by reference herein for all purposes.

FIELD OF TECHNOLOGY

Certain embodiments of the disclosure relate to a media packaging and distribution system. More specifically, certain embodiments of the disclosure relate to a system and method for generating a live output stream manifest based on an event.

BACKGROUND

Currently, in the field of media packaging and distribution systems, rapid development of numerous communication technologies and content broadcasting platforms is being witnessed. Such communication technologies and content broadcasting platforms are revolutionizing the way client devices access and playout media content. Usually, a broadcasting platform, such as analog terrestrial broadcast, digital terrestrial broadcast, direct-to-home satellite broadcast, cable, Internet Protocol (IP), and over-the-top television (OTT), refers to a system that encodes and packages media content and delivers to the client devices associated with end users. Currently, there is a plethora of such broadcasting platforms, each striving to gain access to the content that consumers demand, to differentiate its offering from that of incumbent/competing broadcasting platforms, and/or to find breakthrough modes of media content delivery in order to gain wider audience.

Contemporarily, the broadcasting platforms are relying on modern streaming protocols, such as HTTP Live Streaming (HLS) and Dynamic Adaptive Streaming over HTTP (DASH), to support live streaming provided by various services, such as DIRECTV NOW$^{SM}$, SLING TV$^{SM}$ and PLAYSTATION™ VUE. Existing systems construct a live media output stream in accordance with a scheduled playout time by indexing media content (i.e., pre-encoded assets and/or live input streams) and arranging (i.e. stitching) desired media content segments and associated tags/messages in real-time for immediate playout. In certain scenarios, additional tags/messages may be required be stitched in the live output stream manifest for inserting additional content, such as advertisements or promotional content. The process of stitching may include multiple decision-making steps in real-time when the live output stream manifest is constructed. Therefore, such systems may be referred to as time-based systems as the scheduled playout time of the media content dictates when the live output stream manifest is constructed based on real-time evaluation and real-time stitching of the media content.

In such systems, the real-time stitching is performed consistently whether the live media output stream is being consumed or not. Library of indexed media content is mandatory due to which database costs in such systems rise exponentially. Therefore, resources remain occupied on channels even when the channel is not being viewed. Additionally, the existing systems incorporate manifest reconstruction per loop and high database persistence that may require additional consumption of processing power, storage and other resources. Accordingly, the scalability of the existing systems is limited to a great extent due to the abnormally increased resource utilization owing to the reasons stated above.

Further, processing resource usage for personalizing a live media output stream exceeds the processing resource usage for the non-personalized, generic live media output streams even when not being viewed. Addition of dynamic content to the parent live media output streams for personalization may become challenging due to rigidity of real-time stitching. Thus, the personalization of the live media output stream may also exaggerate the resource costs.

Furthermore, the live output stream manifests generated by the existing systems may be quite error-prone due to the complexity of real-time stitching process. A single error may make the entire live output stream manifest (constructed in real-time) erroneous and there is no room left for taking necessary corrective measures beforehand. All of the above factors and more may undesirably impact the scalability and resource consumption of the overall system on the server-side and availability as well as smooth playout of the live media output stream on the client-side.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and/or methods are provided for generating a live output stream manifest based on an event, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Certain embodiments of the disclosure may be found in a method and system for generating a live output stream manifest based on an event. Instead of time-based generation of live output stream manifests, various embodiments of the disclosure provide an optimized system and method for generating a live output stream manifest in response to occurrence of an event. Such optimized system and method not only provide live stream offerings at zero or nearly-zero additional resource costs and on-the-fly personalization, but also facilitate simple, highly efficient, and highly scalable platform incurring reduced error probability at the server-side. At the client-side, such optimized system and method facilitate guaranteed availability and smooth playout of the live streams with minimal latency, thereby eventually providing a seamless, robust, and personalized viewer experience.

In accordance with various embodiments of the disclosure, a system is provided for generating a live output stream manifest based on an event. The system includes a memory for storing instructions and a processor for executing the instructions to perform a method. The method may include ingesting, by each of a set of discrete service engines, a portion of a programming schedule comprising a playlist of media content. The method may further include obtaining a collection of disparate manifest units based on processing of source manifests encapsulated by the media content. The method may further include storing the collection of disparate manifest units as indexed disparate manifest units in a data store based on a set of indexing parameters. The method may further include generating a live output stream manifest during a current iteration based on an event including a set of indexed disparate manifest units retrieved from the data store in response to a client request comprising a set of client request parameters. The retrieval of the set of indexed disparate manifest units from the data store is performed just-in-time based on a query that corresponds to the set of client request parameters.

Figure 1:
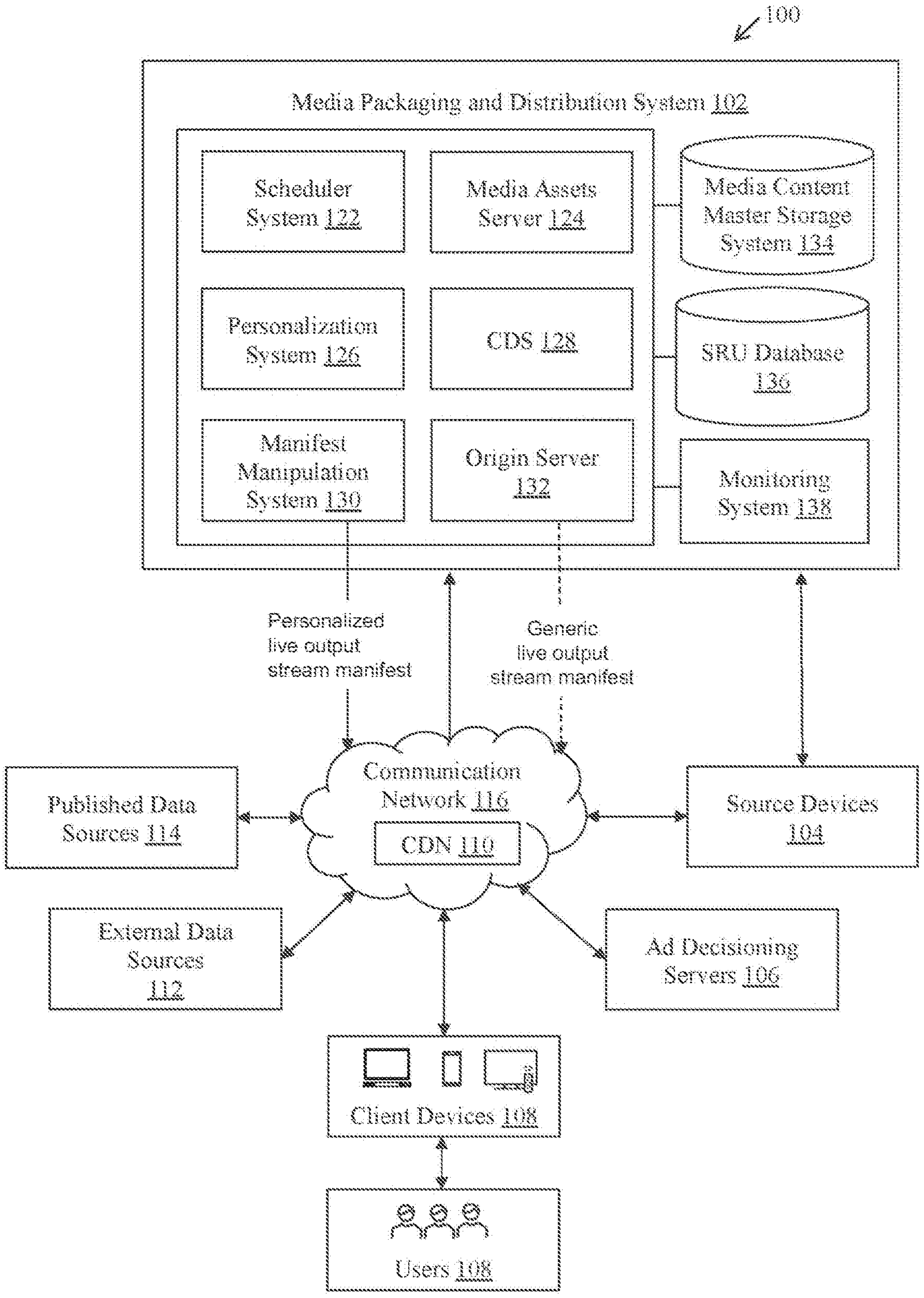
FIG. 1 is a block diagram that illustrates a network environment of a manifest manipulation system in an exemplary media packaging and distribution system for generating a live output stream manifest based on an event, in accordance with an exemplary embodiment of the disclosure.

FIG. 1 is a block diagram 100 that illustrates a network environment of an exemplary manifest manipulation system in a media packaging and distribution system for generating a live output stream manifest based on an event, in accordance with an exemplary embodiment of the disclosure. There is illustrated a media packaging and distribution system 102 that is communicatively coupled to source devices 104, a plurality of Ad decisioning servers 106, a plurality of client devices 108, a content delivery network (CDN) 110, external data sources 112 and a plurality of published data sources 114, via a communication network 116 and/or other programmatic means. Additionally, FIG. 1 illustrates a plurality of users 118 associated with the plurality of client devices 108.

The media packaging and distribution system 102 may comprise at least a scheduler system 122, a media assets server 124, a personalization system 126, a content decisioning service (CDS) 128, a manifest manipulation system 130, an Origin server 132, a media content master storage system 134, a repository of schedules, rights, and user preferences (SRU) database 136, and the monitoring system 138.

The media packaging and distribution system 102 may comprise suitable logic, circuitry, and interfaces that may be configured to execute code that handles media content encoding, packaging, and distribution (for example, multicasting, unicasting, broadcasting, streaming) for one or more channels to be viewed on one or more of the plurality of client devices 108. The media content may comprise audio, video, images, a combination of multiple-audio and/or multiple-video, metadata, manifests, manifest directives, and/or other data (embedded and/or externally referenced). The media content may correspond to a media content class, for example, a television show, a cartoon program, a movie, a news media, an episode, a game, a clip, a recorded sports program, an interactive media, and the like. In this regard, the media packaging and distribution system 102 may provide video programming services to viewers, usually for a subscription fee (such as pay television).

The media packaging and distribution system 102 may be operated by an entity related to handling or distribution of media content, for example, a broadcast provider or operator, or a network provider or network operator. The entity related to handling or distribution of media content may also be referred to as a content owner, a distributor, a syndicator, a re-distributor, a content aggregator, a search, discovery, or cataloging service provider, or any other entity actively or passively involved with the distribution, cataloging, or referencing of complete or partial presentations of media content. The broadcast provider may handle a single channel or a plurality of channels, or one or more networks. The broadcast provider may be configured to distribute content via one or more platforms, for example, traditional over-the-air broadcast channels, radio, cable television networks, satellite communication networks, the Internet, and/or other CDNs.

In accordance with an embodiment, the media packaging and distribution system 102 may be owned by (or associated to) a broadcast provider or operator, a network provider or operator, or a content provider or operator. In this regard, the broadcast provider (not shown) may be configured to execute code that communicates linear video feeds (also referred to as a network television feed or broadcast feed) to the media packaging and distribution system 102. The linear video feed may be communicated as a multi-program transport stream (MPTS) (also referred to as a live video feed) to the media packaging and distribution system 102, via the communication network 116. The communicated linear video feed and the playout schedule may correspond to a channel that is broadcast by the media packaging and distribution system 102, via the communication network 116.

The media packaging and distribution system 102 may receive the MPTS, which includes the signaling content and metadata, from the broadcast provider based on, for example, current society of cable telecommunication engineers (SCTE) standards (SCTE-35 and SCTE-224) to control web and regional blackouts, network end of day switching, and advertisement insertion. For example, the media packaging and distribution system 102 may be signaled for various blackout types with in-band SCTE-35 message. Further, the media packaging and distribution system 102 may receive program metadata that specifies certain operations, such as, when to blackout shows. Examples of legacy distribution system that may be benefitted from the media packaging and distribution system 102 may include direct-broadcast satellite (DBS) providers, cable television (CATV) systems, and other wireline video providers and competitive local exchange carriers (CLECs) using, for example, IPTV.

The source devices 104 may comprise suitable logic, circuitry, and interfaces that may be configured to communicate a live media feed or live input streams of a channel to the media packaging and distribution system 102. In accordance with an embodiment, the live input streams of a channel may correspond to a broadcast feed. In a broadcast chain, the source devices 104, for example, devices from a production studio, may provide actual media content to the media packaging and distribution system 102 in one or more source formats. Examples of the one or more source formats may include, but are not limited to a tape file, or a live feed that may be further converted to a serial digital interface (SDI) video interface and/or on a high-definition SDI (HD-SDI) video interface for processing and playout.

The Ad decisioning servers 106 may comprise suitable logic, circuitry, and interfaces that may be configured to implement at least an advertisement decisioning component that may be used during a real-time content or advertisement placement activity, for example during dynamic ad insertion. The Ad decisioning servers 106 may further determine ad-load opportunity, based on targeting data from the SRU database 136. For example, commercial or non-commercial advertisements may be dynamically inserted within program segments of the live input streams based on the detected upcoming indicator, such as an inbound trigger, a signaling point, and/or a signal in a pre-encoded media asset and/or a live input stream by the Ad decisioning servers 106.

Each of the plurality of client devices 108 may comprise suitable logic, circuitry, and interfaces that may be configured to execute operations that pertain to the presentation of the non-programming media content (for example, graphical or video ads, or overlay ads) with the programming media content (for example, live input streams or on-demand shows) at a display view of each of the plurality of client devices 108. The operations may be performed by a graphical processing unit (GPU) or a computational circuitry in each of the plurality of client devices 108 to obtain encoded non-programming media content and/or programming media content for presentation within the display view. Each of the plurality of client devices 108 may facilitate playback of the non-programming media content and the programming media content via a display device, such as televisions, laptops, or desktops, which may be a peripheral device or may be integrated with each of the plurality of client devices 108.

Each of the plurality of client devices 108 may be further configured to request one of a VOD, a live stream, or a live event stream of programming media content from the media packaging and distribution system 102. In response to a client request, each of the plurality of client devices 108 may receive a live output stream manifest comprising the non-programming media content and programming media content from the media packaging and distribution system 102. Each of the plurality of client devices 108 may refer to end-user devices or consumer devices where the media content is played out for a user from the plurality of users 118. Examples of the plurality of client devices 108 may include, but are not limited to, connected TVs, connected TV with paired and/or connected devices (e.g., HDMI sticks, tablets), personal computers, smartphones, tablets, OTT set-tops, hybrid set-tops, game consoles, and embedded display devices. Each of the plurality of client devices 108 may be associated with a device identifier that may be a unique identifier for corresponding user from the plurality of users 118. Such device identifier may be used by the media packaging and distribution system 102 to discretely personalize delivery of the programming media content and the non-programming media content at a client device from the plurality of client devices 108.

Examples of such device identifier may include, but are not limited to, an International Mobile Equipment Identity (IMEI) number, Android ID, Apple ID, Advertising Identifier (IDFA), Advertising Identifier (AID), Unique Device Identifier (UDID), mobile number, and MacID. An electronic program guide (EPG) may be enabled on each of the plurality of client devices 108 to facilitate the associated user to switch to different programming media content in accordance with a specified user-preference. Each of the plurality of client devices 108 may receive the live output stream manifest of the programming media content and the non-programming media content, via a distribution channel, for example, an IP-based television network. A graphics engine may be configured on each of the plurality of client devices 108 and may be communicatively coupled to a display circuitry of the display device. In accordance with an embodiment, the graphics engine may be integrated with each of the plurality of client devices 108. In accordance with another embodiment, the graphics engine may be present on a cloud or a remote application server and communicatively coupled with corresponding client device.

Further, the programming media content and the non-programming media content corresponding to the live media output stream may be played back by a player at the display view of each of the plurality of client devices 108. The plurality of client devices 108 may further include process/system that may process the output for any means, regardless of the capability or intent to decode for media presentation, and on which the consumer may launch a web page, a web application, or a web service to view media content.

The CDN 110 may correspond to a geographically distributed and networked chain of proxy servers and their data centers that may provide high availability and performance by distributing the media content services spatially relative to the plurality of users 118. In accordance with an embodiment, the CDN 110 may serve as an endpoint for forwarding client requests to the media packaging and distribution system 102. Further, the CDN 110 may serve as a curated repository of live output stream manifests published by the media packaging and distribution system 102 for distribution to the plurality of users 118. The CDN 110 may manage resources for a delivery channel that may be characterized by a frequency band for a broadcast delivery channel or an internet protocol address (IP address) for an IP-based delivery channel. Examples of the delivery channel may include, but are not limited to, a television channel, a radio channel, a webcasting channel, and an IP-based channel that may be hosted on a webpage or an application.

The external data sources 112 may comprise suitable logic, circuitry, and interfaces that may be configured to execute code that handles retrieval and storage of audience data that corresponds to subscribers of the plurality of client devices 108. In accordance with an embodiment, the external data sources 112 may be referenced by the media packaging and distribution system 102 for determining personalized content for the plurality of client devices 108. Audience data may include demographics data, audience targeting data, trending data, device type data, device platform data, and content recognition-based data, such as automatic content recognition (ACR)-based data. The trending data may comprise information on what's trending in the social networks (or platforms), such as Twitter®, Facebook®, and the like. The trending data also comprises information on what's trending based on social engagement, such as number of likes or votes to a particular media item, or number of people watching a particular media item. The trending data may indicate an aggregated interest level of a number of users in the social networks for a particular media item. For example, a thousand or more shares, or likes by a number of users may indicate a highly popular media item.

Each of the plurality of published data sources 114 may be coupled to one or more television networks and may comprise suitable logic, circuitry, and interfaces that may be configured to execute code that provides actual audiences for programs that were distributed. As illustrated in FIG. 1, the plurality of published data sources 114 is coupled to the media packaging and distribution system 102 via the communication network 116 and configured to monitor audience drift to or away from a tuned channel airing a live media output stream. An exemplary published data source may be Nielsen. Nielsen has the capability to determine when a viewer watches the same set of media items, for example, advertisements and/or promotional content, in programming data, such as an episode, in a live video feed within 3 days of original airing and provide Nielsen "C3" credit. Another exemplary published data source may be a published database that provides ratings for a media item, such as gross rating point (GRP). The GRP is advertising or promotion impact measure for each advertising and/or promotional campaigns, known in the art. Other exemplary published data sources may also include direct/indirect access to other public or private data sources (persistent or ephemeral) through programmatic means.

The communication network 116 may comprise suitable logic, circuitry, and interfaces that may be configured to provide a plurality of network ports and a plurality of communication channels for transmission and reception of communication data. The communication data may correspond to data received and/or exchanged, via the communication network 116, among the source devices 104, the plurality of Ad decisioning servers 106, the plurality of client devices 108, the CDN 110, the external data sources 112 and the plurality of published data sources 114. Each network port may correspond to a virtual address (or a physical machine address) for transmission and reception of the communication data. For example, the virtual address may be an Internet Protocol version 4 (IPV4) or an Internet Protocol version 6 (IPV6) address, and the physical address may be a media access control (MAC) address. An application layer may be associated with the communication network 116 for implementation of communication protocols on one or more communication requests from at least one of the one or more computing devices. The communication data may be transmitted or received via a communication protocol. Examples of the communication protocol may include, but are not limited to, a Hypertext Transfer Protocol (HTTP), a File Transfer Protocol (FTP), a Simple Mail Transfer Protocol (SMTP), a Domain Name Server (DNS) protocol, and a Common Management Information Protocol (CMIP) Over Transmission Control Protocol/Internet Protocol TCP/IP (CMOT).

The communication data may be transmitted or received via at least one communication channel of the plurality of communication channels. The communication channels may include, but are not limited to, a wireless channel, a wired channel, a combination of wireless and wired channel thereof. The wireless or wired channel may be associated with a data standard which may be defined by one of a Local Area Network (LAN), a Personal Area Network (PAN), a Wireless Local Area Network (WLAN), a Wireless Sensor Network (WSN), a Wireless Area Network (WAN), and a Wireless Wide Area Network (WWAN). Additionally, the wired channel may be selected on the basis of bandwidth criteria. For example, an optical fiber channel may be used for a high bandwidth communication, and a coaxial cable (or Ethernet-based communication channel) may be used for moderate bandwidth communication. In one scenario, the communication network 116 may be an Internet-based network. For such networks, a broadcast standard may be used, for example, National Television System Committee (NTSC), Phase Alternating Line (PAL), Sequential Color with Memory (SECAM), Moving Picture Experts Group (MPEG), and Digital Video Broadcasting (DVB-S/DVB-S2) or Integrated Services Digital Broadcasting (ISDB-S).

Although, only a single communication network 116 has been illustrated in FIG. 1, there may be more than one communication networks that may or may not share resources to optimally deliver the live output stream manifests from the media packaging and distribution system 102 to the plurality of client devices 108.

The scheduler system 122 may comprise suitable logic, circuitry, and interfaces that may be configured to assimilate, schedule, encode and package multiple programming media content in a personalized playlist of media content for playout to the plurality of client devices 108. The scheduler system 122 may be configured to retrieve the programming media content as per a scheduled playout of the programming media content. The programming media content may be retrieved by the scheduler system 122, in conjunction with one or more of the media assets server 124, the CDS 128, and/or the media content master storage system 134, and/or SRU database 136 within the media packaging and distribution system 102 for assimilation of the retrieved programming media content. As for the uncompressed programming media content, the scheduler system 122 may be configured to encode each of the one or more uncompressed programs. The scheduler system 122 may be configured to transmit the packaged programming media content to the manifest manipulation system 130.

The media assets server 124 may comprise suitable logic, circuitry, and interfaces that may be configured to store non-programming media assets, such as videos or graphics of advertisements, logos, bugs (also referred to as digital on-screen graphics similar to a logo), and promos, trailers, recaps, associated rights, certificates or licenses for the non-programming media content, and the like. In accordance with an embodiment, the media assets server 124 may provide the stored non-programming media assets to the personalization system 126 to personalize the delivery of the non-programming media assets and the programming media content. The media assets server 124 may also store an attribute database of the non-programming media assets. In accordance with measured and/or estimated preferences of a user from the plurality of users 118, context of at least one segment of the media content, and/or a demographic criteria (for example, age, gender and region) may be determined. The media assets server 124 may be part of a media asset network that may be associated with one or more media asset promoters, such as advertisers, or media asset owners. In accordance with various embodiments, a repository of the non-programming media assets may be managed by the media assets server 124, in which each non-programming media asset may correspond to a promotional content for an offering, such as a product offering or a service offering.

Each non-programming media asset in the media stream may be associated with at least an identifier, a playback start time, a playback end time, a media asset format, a file size, a resolution, and a codec. In accordance with an embodiment, a non-programming media asset may be characterized as a promotional advertisement and the corresponding identifier may be an advertisement identifier (Ad-ID). In accordance with an embodiment, a non-programming media asset may be characterized as a promotional advertisement and the corresponding identifier may be a web, image or audio-based beacon that may be present with the corresponding non-programming media asset. The non-programming media assets may correspond to a promotional content that includes at least one of a graphic asset, a textual asset, an audio asset, a video asset, and an animated asset. The one or more operations of the media assets server 124 may be shared or managed by the CDN 110 or the media packaging and distribution system 102, without deviation from the scope of the present disclosure.

The personalization system 126 may comprise suitable logic, circuitry and interfaces that may be configured to operate as a communication interface between the client device 108*a* (client-side) and the manifest manipulation system 130 (server-side), using communication signals. Additional client requests from a client device may be received at the personalization system 126 when a user interacts with a decision point in a live media steam manifest at the player of the corresponding client device. The personalization system 126 may be configured to parse the additional client request parameters in each received additional client request from the client device.

The personalization system 126 may be further configured to form semantic relationship models among preferences, profiles, likes, dislikes, location or demographic factors associated with each user from the plurality of users 118 associated with corresponding client device from the plurality of client devices 108. The semantic relationship models may be statistical models of the one or more user-preferences of each of the plurality of users 118 associated with a corresponding client device from the plurality of client devices 108 and may provide a better understanding of the user-behavior, preferences, attention, intent, and interest for requested one or more preferences of the programming media content.

The personalization system 126 may be configured to personalize viewer experience of users by communicating with existing content decisioning systems, such as CDS 128, and executing/converting schedules provided, for example from an initial programming schedule to a branched programming schedule. The personalization system 126 may be further configured to communicate with one or more Ad servers, such as the plurality of Ad decisioning servers 106, and stitch targeted non-programming media content and customized programming media content, as required by the branched programming schedule and user preferences. According to the branched programming schedule, the live media stream manifests may be personalized by replacing or altering existing media segments, inserting additional media segments, and appending alternate media segments to the live media stream manifests. Thus, the personalization system 126 may be configured to generate the branched programming schedule for a personalized live media output stream (i.e., clips or movies), communicating with a selection service to switch or failover to a different live input stream, and control overlays and other events triggered via the live media stream manifest.

The CDS 128 may comprise suitable logic, circuitry, and interfaces that may be configured to determine, upon request, which programming media content (or partial programming media content) to deliver back to the plurality of client devices 108 based on client request parameters received from the plurality of client devices 108 associated with the plurality of users 118. Thus, the CDS 128 may be configured to alter an existing schedule to insert additional content (including non-programming media content) or replace existing content, according to the client request parameters provided by the plurality of client devices 108 and data stored in various external systems and/or databases.

The CDS 128 may further perform ranking of the identified media content for the plurality of users 118, sorting of the identified media content for the plurality of users 118, and selection of the media content from the sorted and ranked media content. After selection, the CDS 128 may be configured to obtain or negotiate content rights, permissions, or certificates for the selected media content for playout to the plurality of client devices 108, associated with the plurality of users 118.

The manifest manipulation system 130 may comprise suitable logic, circuitry and interfaces that may be configured to manipulate a source manifest of a playlist of media content by deconstructing the source manifest into multiple disparate manifest units and persisting in a temporary data store as indexed disparate manifest units. Based on a stream-specific query, the manifest manipulation system 130 may reconstruct the desired manifest chunks in the desired order as a live media output stream based on an event (i.e. an initial client request for the live media output stream) and return as-is to a client device/player for playback.

In accordance with an embodiment, the manifest manipulation system 130 may personalize the source manifest for a specific client device from the plurality of client devices 108 based on additional client request parameters received from the specific client device. The manifest manipulation system 130 may be configured to publish the live media output stream and the personalized live output stream manifest to the CDN 110 in a single iteration or multiple iterations. The manifest manipulation system 130 is described in detail in FIG. 2A.

The Origin server 132, also referred to as a streaming server, may comprise suitable logic, circuitry, and interfaces that may be configured to store packaged media content (for example, video chunks and manifests/playlists) received from a packager and encoder system (not shown) in the scheduler system 122. The packager and encoder system may ingest a source media content (such as a video), resize the source media content, and compress into different bitrate-resolution combinations. The packager and encoder system may further prepare the compressed media content via adaptive bitrate streaming (ABR) technologies (such as, HLS and MPEG-DASH) for delivery and distribution, the URLs of which may be then published and made known to the CDN 110. Thus, the Origin server 132 may be configured to provide generic live output stream manifest to the CDN 110.

The media content master storage system 134 may comprise suitable circuit, interface that may be configured to store master versions of the media content. The master versions may be used as the source for creating the On-Demand or pre-encoded media assets for clients in the required formats.

The repository of SRU database 136 may comprise suitable logic, circuitry, and interfaces that may be configured to store the schedules for all source feeds, availability rights for all the media content in the schedules, regional blackout zones for the various sports leagues, predefined location-based viewing preferences, individual client viewing preferences, and any viewing or transition rules provided by the stream owner operator. The repository of SRU database 136 may further store data supplied from a stream owner/operator including requirements, preferences, such as pre-defined location-based viewing preferences, stream transition rules, and any required client data, such as service level and zip code. The repository of SRU database 136 may further store user preferences that may affect the live media output stream and/or the personalized live output stream.

The monitoring system 138 may comprise suitable logic, circuitry, and interfaces that may be configured to execute code to monitor media content, for example HTTP Live Streaming (HLS) segments of a pre-encoded media asset as well as corresponding manifest stored in the media content master storage system 134. In accordance with an embodiment, the monitoring system 138 may monitor the overall performance validity/compliance to standards employed by the live media output stream, and quality of both the generic live output stream manifest being distributed by the CDN 110 to the plurality of client devices 108 and the live output stream manifest generated by the manifest manipulation system 130. Accordingly, the monitoring system 138 may provide an input to the scheduler system 122 to update the programming schedule and consequently the generic live output stream manifest generated by the manifest manipulation system 130.

In operation, the scheduler system 122 may generate a programming schedule, for example an initial programming schedule, comprising a playlist of media content for playout. In accordance with an embodiment, the programming schedule may be invoked manually by a user via a scheduler user interface at a client device from a plurality of client devices 108. The programming schedule may be generated manually for playout of generic media content as a live or VOD stream. In accordance with another embodiment, the scheduler system 122, in conjunction with the media assets server 124, the CDS 128, the SRU database 136, and the source devices 104, may automatically generate the programming schedule programmatically through scheduler application program interfaces (APIs).

The scheduler system 122 may communicate the programming schedule to the manifest manipulation system 130. The manifest manipulation system 130 may ingest the programming schedule and obtain a collection of disparate manifest units based on processing of source manifests encapsulated by the media content. The ingestion of the source manifests may include deconstructing HLS directives within the source manifests. The manifest manipulation system 130 may further perform indexing of the disparate manifest units based on a set of indexing parameters. For example, the disparate manifest units may be indexed according to the identifier of the live output stream manifest as well as the corresponding playout time of the media segment per the initial programming schedule and sequence of the media segment in the source manifest. Thus, the manifest manipulation system 130 may store (or persist) the indexed collection in the data store ahead of a scheduled playout.

In accordance with an embodiment, for playout, a client device from the plurality of client devices 108 may generate an initial client request (pertaining to a playlist of media content) that may be transmitted to the CDN 110. The CDN 110 may further transmit the initial client request comprising a set of client parameters to the media packaging and distribution system 102. Upon receiving an initial set of client request parameters corresponding to the initial client request, the manifest manipulation system 130 may retrieve (or select) set of indexed disparate manifest units from the data store just-in-time based on a query that corresponds to the initial set of client request parameters associated with the initial client request or set of parameters inferred from the set of client request parameters. The manifest manipulation system 130 may generate a live output stream manifest during a current iteration based on an event including the set of indexed disparate manifest units retrieved from the data store in response to the initial client request. The manifest manipulation system 130 may further directly transmit the live output stream manifest to the client device or the CDN 110 and then to the client device. The transmission of the disparate manifest units may be in a sequence defined in the initial programming schedule, the initial set of client request parameters, and/or the set of indexing parameters. The live output stream manifest may be received by the client device as one of a live stream, a live event stream or a VOD based on a user selection of desired type of live output stream manifest.

In accordance with an embodiment, the disparate manifest units from the set of indexed disparate manifest units may be transmitted by the manifest manipulation system 130 in entirety, groups of various sizes, or one-by-one in an asynchronous manner (corresponding to selection of VOD type) during the current iteration.

In accordance with another embodiment, corresponding to the selection of live stream or live event stream type, the manifest manipulation system 130 may receive an updated client request associated with the stream identifier of the live media output stream when the live output stream manifest is played out at the client device. In response to the updated client request, the manifest manipulation system 130 may retrieve new indexed disparate manifest units from the data store based on an updated query that corresponds to an updated set of client request parameters. Accordingly, the manifest manipulation system 130 may generate an updated live output stream manifest during a subsequent iteration based on the set of indexed disparate manifest units and the new indexed disparate manifest units retrieved from the data store. The updated live output stream manifest may be generated based on another event, i.e. receipt of updated client request. In an embodiment, the new indexed disparate manifest units may be continually added to the set of indexed disparate manifest units in the manifest window during subsequent iterations. In another embodiment, the new indexed disparate manifest units may replace older manifest units from the set of indexed disparate manifest units in the manifest window during subsequent iterations. In such case, the size of the manifest window remains as defined or inferred based on the updated client request parameters.

In accordance with another embodiment, a decision point may be encountered by a player at the client device during a playout of the current iteration of the live output stream manifest. The user may perform an interaction at the decision point, in response to which the personalization system 126 may receive or infer the additional set of client request parameters from the client device. The personalization system 126 may determine the personalized media content based on the user interaction performed at the decision point and generate a differential programming schedule based on the determined personalized media content and the additional set of client request parameters. The scheduler system 122 may generate a branched programming schedule based on the integration of the differential programming schedule with the initial programming schedule. The manifest manipulation system 130 may generate the personalized live output stream manifest during subsequent iteration based on another event that corresponds to the receipt of the branched programming schedule.

The manifest manipulation system 130, as described herein, may provide various feature-enabled benefits that may provide significant saving impact. For example, for programming schedules that comprise only pre-encoded media assets, the manifest manipulation system 130 remains idle until a user requests a live output stream manifest. Hence resources are only utilized on channels with active viewers (i.e. the users) only. As the library of ingested or indexed media content, i.e. pre-encoded media assets and/or live input streams, is not required, data storage costs are tied to actual usage. Further, as the size of the data store is tied to stored playout time (for example, DVR window that defines the length of the sliding manifest window of time for which the media content will be available), even database costs are malleable. Furthermore, as personalization only requires differential schedules, minimal costs may be incurred to add personalize live media output streams with potential for zero costs.

Further, the manifest manipulation system 130 generates the live output stream manifest just-in-time, i.e., only when it is being requested and the user is viewing the media content referenced by the live output stream manifest. Thus, resource usage by a given live output stream manifest may be completely tied to the number of client devices currently consuming the live output stream manifest, less the costs of data storage, and having a dramatic effect on the number of resources consumed. Due to the same reason, the media packaging and distribution system 102 comprising the manifest manipulation system 130 can easily scale up and down according to active viewers without incurring any additional costs. The media packaging and distribution system 102 comprising the manifest manipulation system 130 may further allow for 1:1 streams/user, in other words, personalized live output stream manifest for each user on-the-fly with zero or nearly-zero additional resource costs. As the stitching task is only done in bursts, the resources are not busy all the time. Also, seamless support for time-shifting to past and future programs, branching streams, personalized streams, and insertion of non-programming media content (such as ad creatives, personalized overlays, triggers, captions, and alternate languages) may make the media packaging and distribution system 102 a highly robust, scalable, and resource-saving system.

Figure 2A:
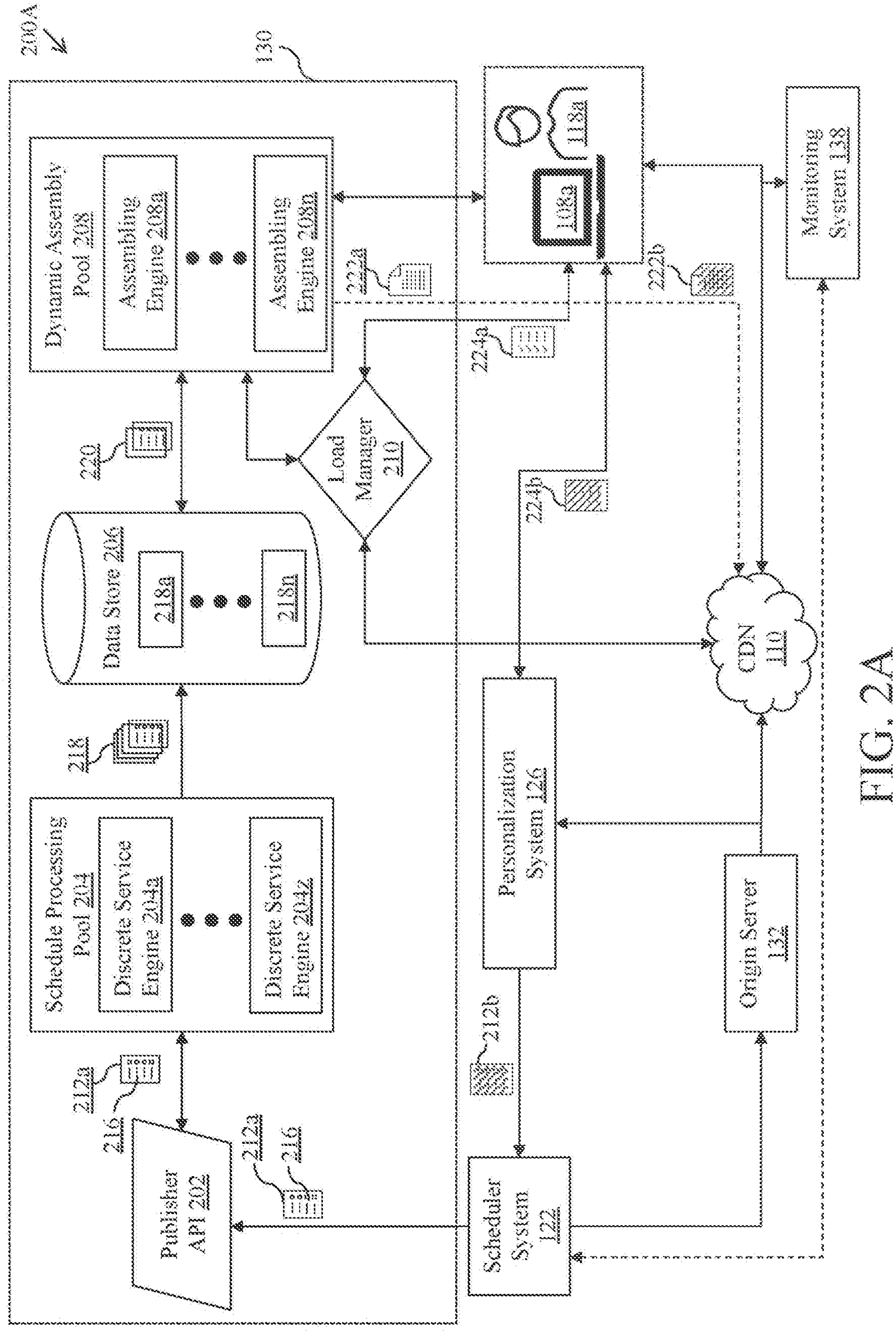
FIG. 2A is a block diagram that illustrates the manifest manipulation system and other systems of the media packaging and distribution system of FIG. 1 for generating a live output stream manifest based on an event, in accordance with an exemplary embodiment of the disclosure.
Figure 3A:
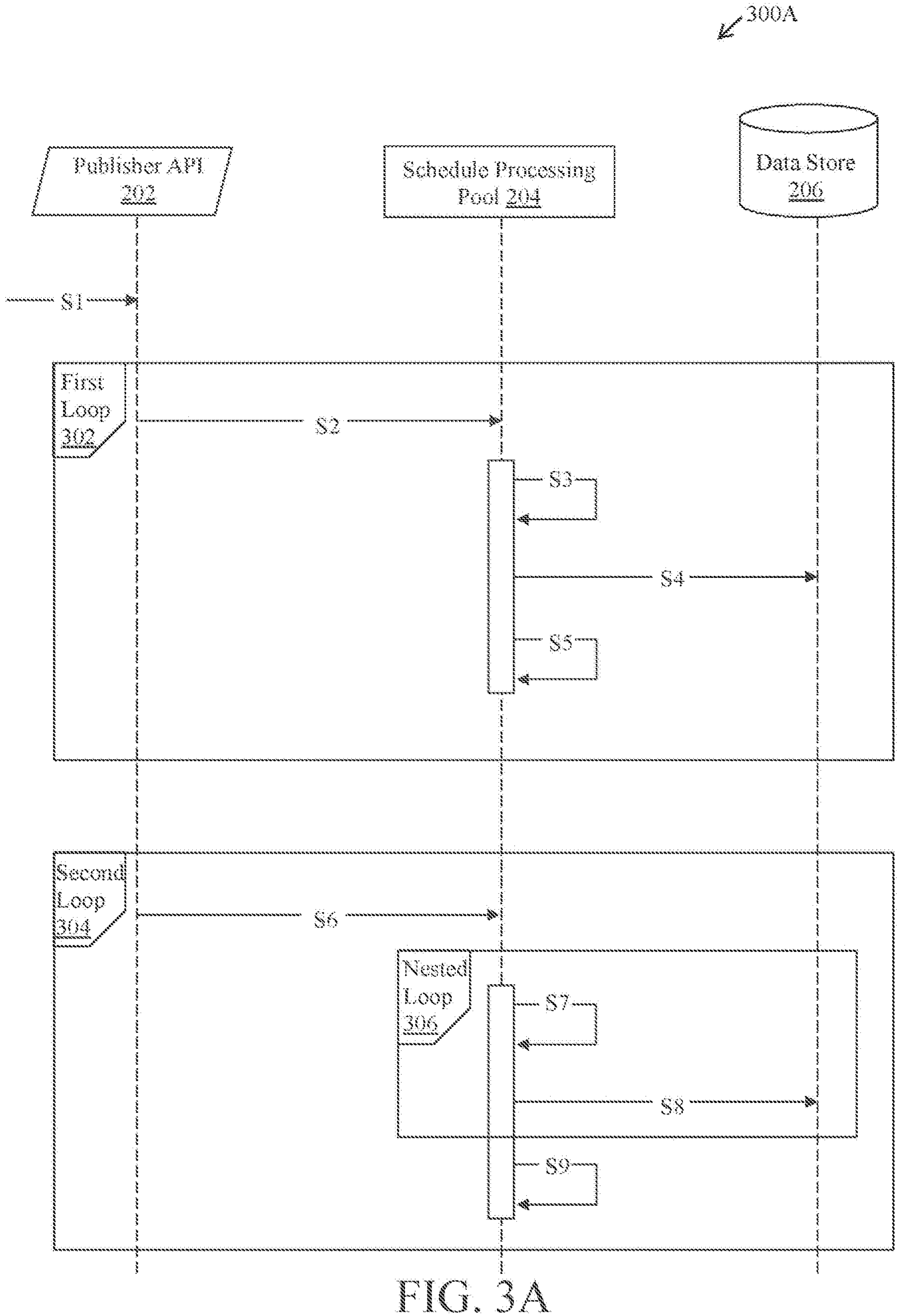
FIG. 3A illustrates a first sequence diagram for operational steps performed upon receiving a first programming schedule by the manifest manipulation system of FIG. 2A, in accordance with an exemplary embodiment of the disclosure.
Figure 3B:
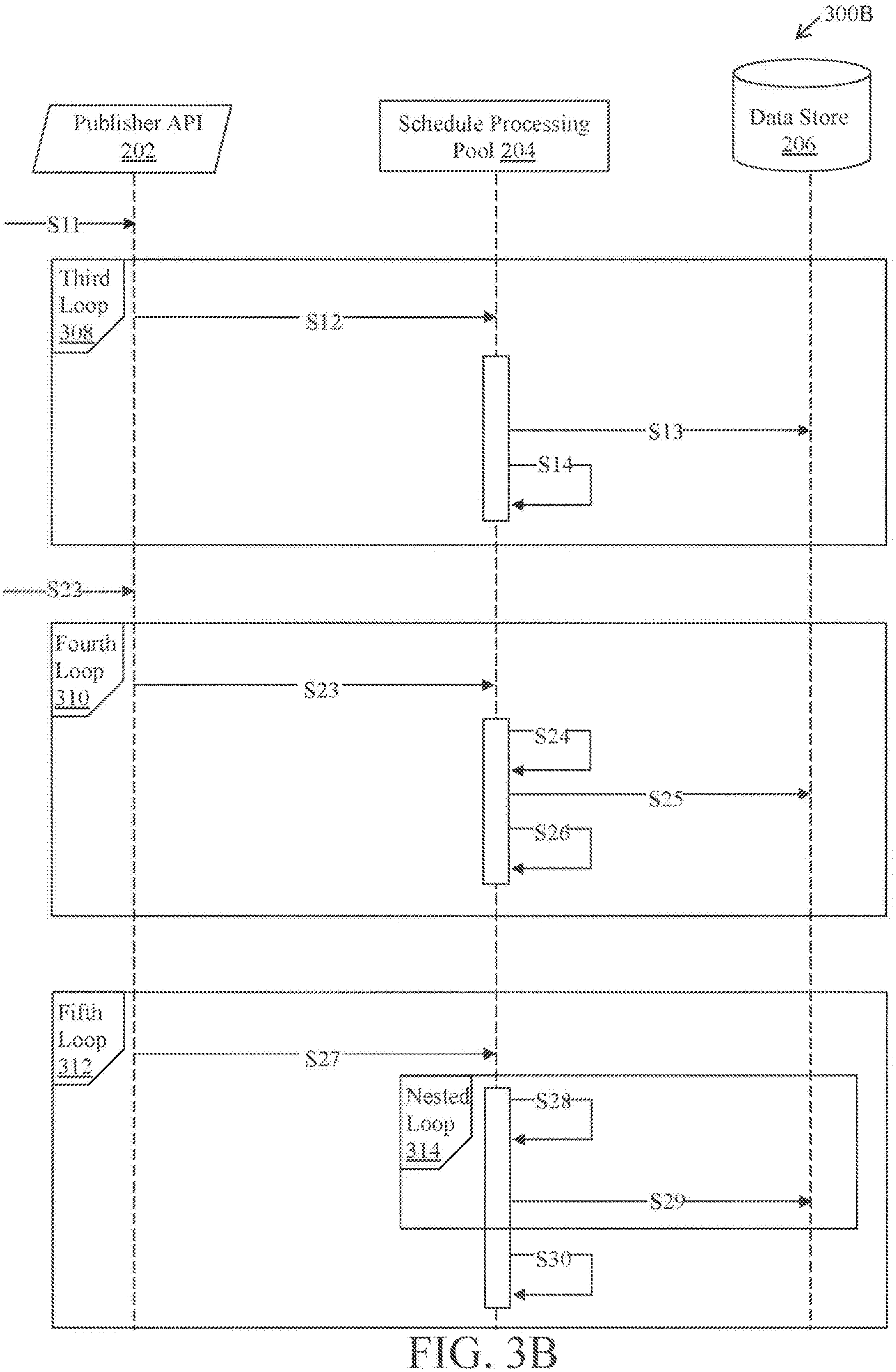
FIG. 3B illustrates a second sequence diagram for operational steps performed upon receiving schedule update and a second programming schedule by the manifest manipulation system of FIG. 2A, in accordance with an exemplary embodiment of the disclosure.

FIG. 2A is a block diagram 200A that illustrates the manifest manipulation system 130 for generating a live output stream manifest based on an event, in accordance with an exemplary embodiment of the disclosure. FIG. 2A is described in conjunction with FIGS. 3A and 3B. Specifically, FIG. 3A illustrates a first sequence diagram 300A for operational steps performed upon receiving a first programming schedule by the manifest manipulation system of FIG. 2A, in accordance with an exemplary embodiment of the disclosure. FIG. 3B illustrates a second sequence diagram 300B for operational steps performed upon receiving a schedule update and a second programming schedule by the manifest manipulation system of FIG. 2A, in accordance with an exemplary embodiment of the disclosure.

Referring to FIG. 2A, the manifest manipulation system 130 comprises a plurality of processing engines, such as a publisher application programming interface (API) 202, a schedule processing pool 204 comprising a set of discrete service engines 204*a*, . . . , 204*z*, a data store 206, a dynamic assembly pool 208 comprising a plurality of assembling engines 208*a*, . . . , 208*n*, and a load manager 210. There is also illustrated a first programming schedule 212*a*, a second programming schedule 212*b*, a source manifest 216, a collection of disparate manifest units 218 comprising disparate manifest units 218*a*, . . . , 218*n*, a set of indexed disparate manifest units 220, an exemplary live output stream manifest 222*a*, an exemplary set of client request parameters 224*a*, and an exemplary additional set of client request parameters 224*b*. FIG. 2A further illustrates the CDN 110, a client device 108*a* from the plurality of client devices 108, and a user 118*a* from the plurality of users 118. Although not shown in FIG. 2A, the plurality of processing engines may include one or more processors that may operate on instructions that may be stored in a memory present on the client device 108*a*.

In some embodiments of the disclosure, the publisher API 202, the schedule processing pool 204, the data store 206, and the dynamic assembly pool 208 may be integrated to form an integrated system, as illustrated in FIG. 2A. In other embodiments of the disclosure, the publisher API 202, the schedule processing pool 204, the data store 206, and the dynamic assembly pool 208 may be implemented external to the manifest manipulation system 130 without loss of generality. Other separation and/or combination of the various entities of the exemplary media packaging and distribution system 102 illustrated in FIG. 2A may be done without departing from the spirit and scope of the various embodiments of the disclosure.

The publisher API 202 may comprise suitable logic, circuitry, and interfaces that may be configured to execute code to receive the first programming schedule 212*a* and/or the second programming schedule 212*b* from the scheduler system 122. Once received, the publisher API 202 may be configured to issue commands to available worker(s), i.e. the set of discrete service engines 204*a*, . . . , 204*n* from the schedule processing pool 204.

The schedule processing pool 204 may comprise suitable logic, circuitry, and interfaces that may be configured to execute code to process a programming schedule, such as the first programming schedule 212*a* and/or the second programming schedule 212*b*. Based on the processing, the schedule processing pool 204 may be configured to obtain a collection of disparate manifest units 218, that may also be referred to as manifest chunks. The collection of disparate manifest units 218 may be stored in the data store 206, such as a dynamic cache.

The schedule processing pool 204 may comprise the set of discrete service engines 204*a*, . . . , 204*n*, also referred to as workers. Each discrete service engine from the set of discrete service engines 204*a*, . . . , 204*n* may be configured to deconstruct a source manifest of the first programming schedule 212*a* and/or the second programming schedule 212*b* and obtain the collection of disparate manifest units 218. During such pre-processing, the schedule processing pool 204 may be configured to change the processing state of the set of discrete service engines 204*a*, . . . , 204*n* to BUSY. Upon completion of the pre-processing of the first programming schedule 212*a* and the second programming schedule 212*b*, the schedule processing pool 204 may deallocate the set of discrete service engines 204*a*, . . . , 204*n* from corresponding instructions, and change the processing state of the set of discrete service engines 204*a*, . . . , 204*n* to AVAILABLE. Once the processing state of the set of discrete service engines 204*a*, . . . , 204*n* is changed to AVAILABLE, the set of discrete service engines 204*a*, . . . , 204*n* may be ready for pre-processing the next programming schedule.

During the pre-processing to obtain the collection of disparate manifest units 218, the source manifest 216 may be only processed once for n streams. The set of discrete service engines 204*a*, . . . , 204*n* may add tags autonomously according to the placement of the disparate manifest units. For example, "Discontinuity" tag may be added corresponding to preceding break or end of an asset, or "program start/end" tags may be intelligently added for appropriate disparate manifest units. Additional SCTE messages may also be added according to the scheduling. The schedule processing pool 204 may further create manifest headers for each new time-segment.

The data store 206 may correspond to a temporary storage system, which may be a database, a data file or multiple data files, in-memory cache, a hybrid data system, a data server, a peer-to-peer data network, a dynamic cache, or the like. The data store 206 may temporarily persist the collection of disparate manifest units 218, i.e. the manifest chunks, in a tabular format, binary format, or key-value format, comprising a plurality of fields.

Such manifest units once stored in the data store 206 as the collection of disparate manifest units 218, may be assigned to one or more live output stream manifests as-is whenever queried by the dynamic assembly pool 208. Recent manifest units may be cached in-memory, whereas older manifest units may be stored on backup storage devices, such as disks.

The dynamic assembly pool 208 comprising a plurality of assembling engines 208*a*, . . . , 208*n* may correspond to a collection of assembler services to aid in load-balancing requests at scale. The dynamic assembly pool 208 may be configured to build and execute a stream-specific query (or simply the query) to the data store 206 based on a request protocol (i.e., an initial set of client request parameters associated with an initial client request, an updated set of client request parameters associated with an updated client request, or an additional set of client request parameters associated with an additional client request) and/or configured ahead of time. The parameters in the URL may include, for example, a stream identifier, a playout time identifier, a user identifier, and the like. Such query only selects the set of indexed disparate manifest units 220 from the data store 206 as HLS texts. Accordingly, the dynamic assembly pool 208 may determine the indexed set of manifest units 220 from the data store 206 at the time of the client request. Thus, in a way, the dynamic assembly pool 208 may be configured to generate a live output stream manifest based on an event that may include the set of indexed disparate manifest units 220 from the collection of disparate manifest units 218. The dynamic assembly pool 208 performs no processing on the set of indexed disparate manifest units 220 and simply outputs the set of indexed disparate manifest units 220 as-is. In accordance with an embodiment, the dynamic assembly pool 208 may scale its assembly pool whenever necessary.

In accordance with various embodiments, the generation of the live output stream manifest may be driven as a reaction to an event, further referred to as a trigger or stimulus to the manifest manipulation system 130. The stimulus may or may not be a reaction to time or additional or modified programming schedule. As described in the disclosure, the event may correspond to the first programming schedule 212*a*, the second programming schedule 212*b*, or a user interaction performed at a decision point during the playout. However, it should be noted that the above examples are non-limiting, and other programming schedules or any other input to the manifest manipulation system 130 may correspond to the event, without any deviation from the scope of the disclosure.

The plurality of assembling engines 208*a*, . . . , 208*n* may correspond to multiple units of discrete services which handle requests for live output stream manifests from the plurality of client devices 108. The plurality of assembling engines 208*a*, . . . , 208*n* may be configured to parse the set of client request parameters given in the client request that may aid in querying the data store 206. The plurality of assembling engines 208*a*, . . . , 208*n* may return the query results, i.e. the indexed set of manifest units 220 retrieved from the data store 206, as a live output stream manifest.

The load manager 210 may comprise suitable logic, circuitry, and interfaces that may be configured to execute code to assign the client request to one or more of the plurality of assembling engines 208*a*, . . . , 208*n* in the dynamic assembly pool 208. The assignment of the client request may follow one of various protocols to balance request load across the plurality of assembling engines 208*a*, . . . , 208*n*. In accordance with one exemplary protocol, i.e. Round-Robin protocol, the load manager 210 may select one or more of the plurality of assembling engines 208*a*, . . . , 208*n* for assignment in a priority list. In accordance with another exemplary protocol, i.e. Fixed order protocol, the load manager 210 may select one or more of the plurality of assembling engines 208*a*, . . . , 208*n* for assignment in a fixed order. In accordance with yet another exemplary protocol, i.e. Random order protocol, the load manager 210 may select one or more of the plurality of assembling engines 208*a*, . . . , 208*n* for assignment in a random order. In accordance with yet another exemplary protocol, i.e. Availability protocol, the load manager 210 may select first-available assembling engines (i.e., the ones that are not handling any client requests) from the plurality of assembling engines 208*a*, . . . , 208*n* for assignment. In accordance with yet another exemplary protocol, i.e. Resource Availability protocol, the load manager 210 may select the assembling engines from the plurality of assembling engines 208*a*, . . . , 208*n* for assignment based on amount of computing resources being currently consumed by them.

The first programming schedule 212*a* may correspond to an instruction set for a live media output stream or an updated live media output stream during one or more iterations for a client device, such as the client device 108*a*, upon the initial client request or the updated client request. In accordance with an embodiment, the first programming schedule 212*a* may be generated by the scheduler system 122 based on an initial set of client request parameters to provide an initial playlist of media content to the manifest manipulation system 130. In accordance with another embodiment, the first programming schedule 212*a* may be generated by the scheduler system 122 based on an updated set of client request parameters corresponding to the updated client request. The updated client request may be associated with the initial client request, for example, when live streams or live input streams require subsequent iterations for ingesting the live input streams. The first programming schedule 212*a* may also support defining programming indicators, non-programming indicators, interactive elements, and programming markers, within the pre-encoded media asset and live input stream and at locations and durations within the pre-encoded media asset and live input stream switches.

The second programming schedule 212*b* may correspond to an instruction set for one of a differential programming schedule, an updated programming schedule, an alternate programming schedule, or other such ancillary programming schedule. The second programming schedule 212*b* may be dynamically generated by the scheduler system 122 based on additional set of client request parameters. The second programming schedule 212*b* may provide a subsequent playlist of media content to the manifest manipulation system 130. The second programming schedule 212*b* may also support defining programming indicators, non-programming indicators, interactive elements, and programming markers, within the pre-encoded media asset and live input stream and at locations and durations within the pre-encoded media asset and live input stream switches.

The source manifest 216, which acts as an input for the manifest manipulation system 130, may correspond to a text-based instruction set that provides information about which and where to retrieve media content segments (corresponding to a playlist of media content for the client device 108*a*) to play next. The source manifest 216 may enlist the media segments that make up the full length of the media content for the client device 108*a*. The source manifest 216 and/or media content segments may also include and/or specify additional information to facilitate the player at the client device 108*a* to transition smoothly between media content streams from different sources. The source manifest 216 may be used for creating a playlist of media content (or media content files), and/or for interrupting the media content with non-programming media content, such as advertisements, and then resuming the media content.

The collection of disparate manifest units 218 may comprise multiple disparate manifest units, each of which includes a corresponding referenced media segment (as absolute or relative path to a media file or a uniform resource locator (URL)) and one or more manifest directives. A manifest directive may be associated with corresponding media segment or a placement of the media segment within the source manifest 216. The collection of disparate manifest units 218 may be stored as indexed disparate manifest units in the data store 206 based on a set of indexing parameters.

The set of disparate manifest units 218 may comprise one or more disparate manifest units from the collection of disparate manifest units 218 stored as indexed disparate manifest units in the data store 206. Each of the set of disparate manifest units 218 may include a corresponding referenced media segment (as absolute or relative path to a media file or a URL) and one or more manifest directives. Based on a query that corresponds to a set of client request parameters, the retrieval of the set of disparate manifest units 218 from the data store 206 may be performed just-in-time.

The exemplary live output stream manifest 222*a*, which acts as an output of the manifest manipulation system 130, may correspond to a text-based instruction set that instructs a player at the client device 108*a* about which and where to retrieve media content segments for playback of the live media output stream. In accordance with an embodiment, based on an event (such as receipt of initial set of client request parameters), the exemplary live output stream manifest 222*a* may be generated during a current iteration including the set of indexed disparate manifest units 220 retrieved from the data store 206 in response to the initial client request comprising the initial set of client request parameters. In accordance with another embodiment, based on another event (such as receipt of updated set of client request parameters), the exemplary live output stream manifest 222*a* may be generated during a subsequent iteration including next set of indexed disparate manifest units retrieved from the data store 206 in response to the updated client request comprising the updated set of client request parameters.

In accordance with an embodiment, the media content segments are made available as soon as they are generated. In some protocols, each new segment is added to the exemplary live output stream manifest 222*a* while in others the player is provided with information that may be utilized to calculate what the next live segment will be. In the latter case, a signal in the media content itself may be utilized to inform the player when to re-inspect or check the exemplary live output stream manifest 222*a* for a change in media content.

In accordance with various embodiments, different types of the exemplary live output stream manifest 222*a* may be generated. For example, one type of the exemplary live output stream manifest 222*a* may be a live media output stream with a moving manifest window, where the window consists of a set number of disparate manifest units, i.e., manifest chunks, that rotate with playout. Another type of the exemplary live output stream manifest 222*a* may be a live event stream, where the window of the disparate manifest units, i.e., manifest chunks, is appended as playout progresses. Yet another type of the exemplary live output stream manifest 222*a* may be a VOD stream, where the totality of the media content consisting of all the disparate manifest units, i.e., manifest chunks, are returned all at once.

The live media output stream may include streaming content corresponding to playlist of live input streams and/or pre-encoded media assets that may be played back on a client device, such as the client device 108*a*. Upon an initial and updated client requests, that may be generated from a per-client schedule, such as the first programming schedule 212*a*, the live media output stream may be generated. Various media container formats of the live input streams and/or pre-encoded media assets may include, but are not limited to, transport stream (TS), segmented streaming (such as fragmented MP4 (fMP4)), Common Media Application Format (CMAF), or a progressive download, via any mode of distributing a multimedia presentation, such as via an over-the-air content delivery/distribution network, a linear content delivery/distribution network, a cable content delivery/distribution network, a satellite content delivery/distribution network, an Internet Protocol (IP) based content delivery/distribution network, and/or the like.

The exemplary personalized live output stream manifest 222*b* may correspond to a text-based instruction set that instructs a player at the client device 108*a* about which and where to retrieve generic and personalized media content segments. In accordance with an embodiment, based on an event, such as receipt of the second programming schedule 212*b*, the exemplary personalized live output stream manifest 222*b* may be generated during a subsequent iteration including the set of indexed disparate manifest units 220 and personalized disparate manifest units (not shown) retrieved from the data store 206 in response to the additional client request comprising the additional set of client request parameters.

The exemplary set of client request parameters 224*a* may correspond to multiple parameters associated with an initial client request or an updated client request received or inferred from a client device, such as the client device 108*a*. In accordance with an embodiment, the initial client request may comprise basic client request parameters, such as, a live media output stream identifier, a playout time, a manifest window size, and a type of live output stream manifest. In accordance with another embodiment, the updated client request may comprise updated client request parameters that are received or inferred from the client device, such as the client device 108*a*.

The exemplary additional set of client request parameters 224*b* may correspond to multiple parameters associated with an additional client request received or inferred from a client device, such as the client device 108*a*. The additional client request may comprise additional set of client request parameters that are received or inferred from the client device, such as the client device 108*a*, in response to the user interaction performed at a decision point within the live media output stream. The exemplary additional set of client request parameters 224*b* may comprise additional information and the live media output stream identifier associated with the live output stream manifest that acts as a parent stream manifest.

In accordance with the first sequence diagram 300A, the publisher API 202 may receive the first programming schedule 212*a* from the scheduler system 122 (S1). The first programming schedule 212*a* may be an initial programming schedule generated by the scheduler system 122 based on initial parameters, such as localizations of audience segments, content rights and preferences, ad preferences, and requirements of stream owner/operator. Alternatively, the first programming schedule 212*a* may be generated by the scheduler system 122 based on an initial set of client request parameters specifically provided by a user (from the plurality of users 118) associated with a client device (from the plurality of client devices 108).

The first programming schedule 212*a* may include a source manifest 216. In accordance with an exemplary embodiment, the source manifest 216 corresponds to a plurality of pre-encoded media asset manifests only. In such embodiment, for every pre-encoded media asset manifest, a first loop 302 continues until all of the plurality of pre-encoded media asset manifests are stored in the data store 206 as respective collections of disparate manifest units. In each iteration, the schedule processing pool 204 may create a worker, such as a first discrete service engine 204*a* (S2). The first discrete service engine 204*a* may parse the pre-encoded media asset manifest into the collection of disparate manifest units 218 (S3). The first discrete service engine 204*a* may store the collection of disparate manifest units 218 in the data store 206 with playout time and time-to-live (TTL) of each pre-encoded media asset manifest (S4). The playout time and TTL may be determined based on start and end times of the first programming schedule 212*a*. The first discrete service engine 204*a* may end (S5).

In accordance with another exemplary embodiment, the source manifest 216 corresponds to a plurality of live input stream manifests only. In such embodiment, for every live input stream manifest, a second loop 304 continues until all of the plurality of live input stream manifests are stored in the data store 206 as respective collections of disparate manifest units. In each iteration of the second loop 304, the schedule processing pool 204 may create a worker, such as a second discrete service engine 204*b* with LIVE flag and live event start/end (S6). A nested loop 306 continues till the live input stream manifest is parsed into the collection of disparate manifest units 218 for the duration of live event. In each iteration of the second loop, the second discrete service engine 204*b* may parse the live input stream manifest into the collection of disparate manifest units 218 (S7). The second discrete service engine 204*b* may further store the collection of disparate manifest units 218 in the data store 206 with playout time and time-to-live (TTL) of each pre-encoded media asset manifest (S8). As the second loop 304 ends, the second discrete service engine 204*b* may auto-terminate (S9).

In accordance with the second sequence diagram 300B, the publisher API 202 may receive a schedule update from the scheduler system 122 (S11). In accordance with an embodiment, the schedule update may be generated by the scheduler system 122 based on a requirement for purging the cache of the data store 206 of specific, invalid, and unplayed manifest units. The schedule update may utilize deterministic identifiers of each part of the media content (live input stream and/or the pre-encoded media asset) to specifically target manifest units.

In a third loop 308 that continues for all schedule updates received at the publisher API 202 (S11), for example, to remove each part of the media content or for a programming schedule with time changed, the schedule processing pool 204 may create a worker, such as a discrete service engine 204*z* (S12). The discrete service engine 204*z* may remove corresponding disparate manifest units (by deterministic identifiers and/or schedule start) from the collection of disparate manifest units 218 stored in the data store 206 (S13) and the discrete service engine 204*z* ends (S14).

In accordance with another embodiment, the publisher API 202 may receive a second programming schedule 212*b* from the scheduler system 122 (S22). The second programming schedule 212*b* may be a differential programming schedule generated by the scheduler system 122 based on a user interaction of a user (from the plurality of users 118) associated with a client device (from the plurality of client devices 108) with one or more decision points. The differential programming schedule may correspond to an alternate (or new) programming schedule that may include an alternate (or new) source manifest (not shown). In accordance with an exemplary embodiment, the alternate (or new) source manifest may correspond to a plurality of alternate (or new) pre-encoded media asset manifests and/or live input stream manifests. Alternatively, the second programming schedule 212*b* may be a new programming schedule for replacing existing manifest units.

In such embodiment, for every alternate (or new) pre-encoded media asset manifest, a fourth loop 310 continues until all of the plurality of alternate (or new) pre-encoded media asset manifests is stored in the data store 206 as respective collections of disparate manifest units. The schedule processing pool 204 may create a worker, such as a third discrete service engine 204*c* (S23). The third discrete service engine 204*c* may parse the alternate (or new) pre-encoded media asset manifest into the collection of disparate manifest units 218 (S24). The third discrete service engine 204*c* may store the collection of disparate manifest units 218 in the data store 206 with playout time and TTL of each alternate (or new) pre-encoded media asset manifest (S25). The playout time and the TTL may be determined based on the start and end time of the differential (or new) schedule. The third discrete service engine 204*c* may end (S26). The fourth loop 310 continues until all of the plurality of pre-encoded media asset manifests is stored in the data store 206 as respective collections of disparate manifest units.

In accordance with an exemplary embodiment, the alternate (or new) source manifest corresponds to a plurality of alternate (or new) live input stream manifests only. In such embodiment, for every alternate (or new) live input stream manifest, a fifth loop 312 continues until all of the plurality of alternate (or new) live input stream manifests is stored in the data store 206 as respective collections of disparate manifest units. In each iteration of the fifth loop 312, the schedule processing pool 204 may create a worker, such as a fourth discrete service engine 204*d* with LIVE flag and live event start/end (S27). A nested loop 314 continues till the alternate (or new) live input stream manifest is parsed into the collection of disparate manifest units 218 for the duration of live event. In each iteration of the nested loop 314, the fourth discrete service engine 204*d* may parse the alternate (or new) live input stream manifest into the collection of disparate manifest units 218 (S28). The fourth discrete service engine 204*d* may further store the collection of disparate manifest units 218 in the data store 206 with playout time and time-to-live (TTL) of each pre-encoded media asset manifest (S29). As the fifth loop 312 ends, the fourth discrete service engine 204*d* may auto-terminate (S30).

Figure 3C:
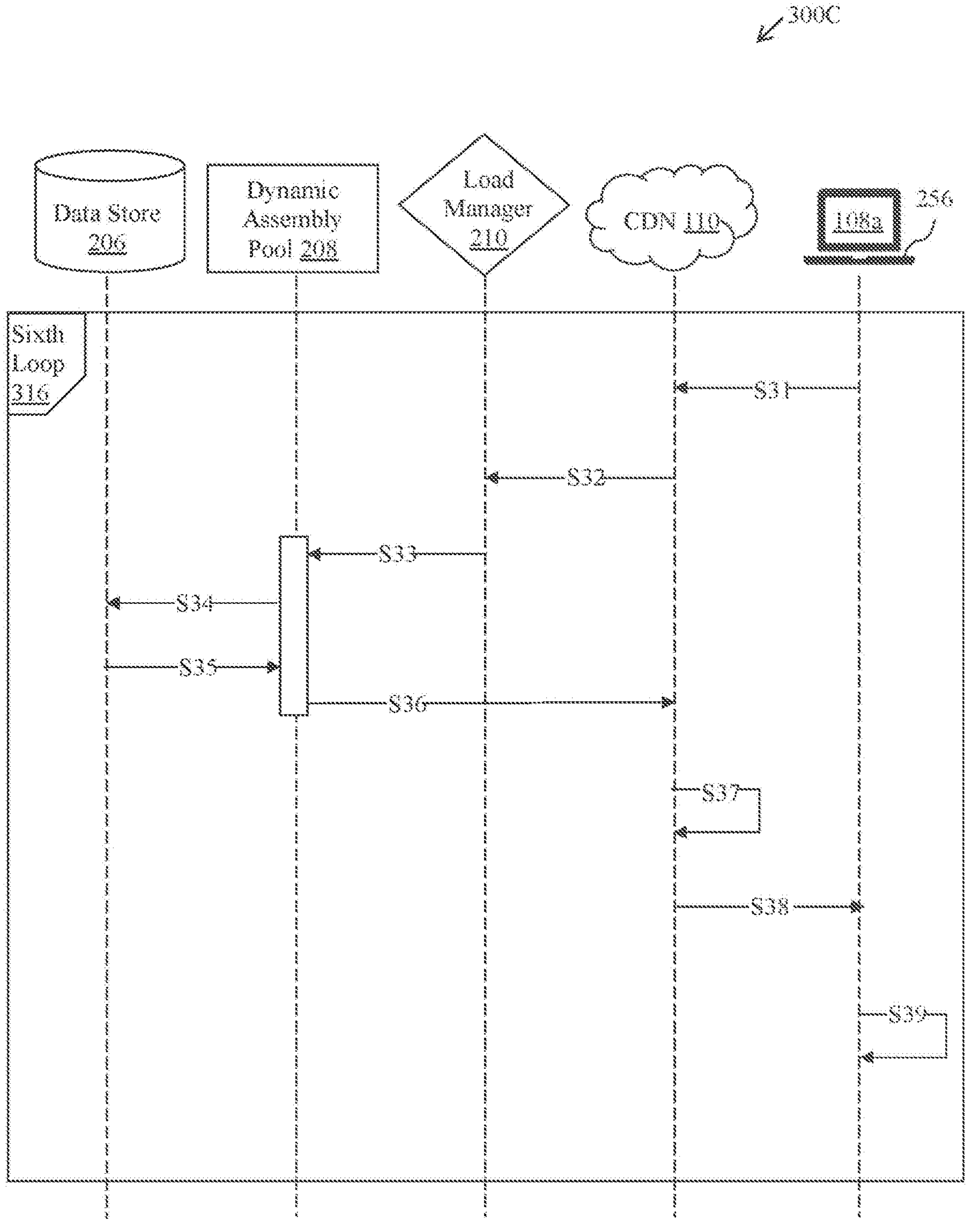
FIG. 3C illustrates a third sequence diagram for playback of the live output stream manifest, in accordance with an exemplary embodiment of the disclosure.

Thus, the manifest manipulation system 130 of FIG. 2A, in conjunction with FIG. 3A to 3C, describes that the live media output stream exhibits event-based publishing to the CDN 110. Examples of such events may include the receipt of programming schedules, such as the first programming schedule 212*a* and the second programming schedule 212*b*, or the user input, such as user interaction provided at the decision point based on which branched programming schedules may be generated. Further, a source manifest may be stored per-manifest unit in the data store 206, not as an entire manifest. The stitching in the manifest manipulation system 130 is not time-based, i.e. not performed in real-time for immediate playout. Rather, the stitching in the manifest manipulation system 130 is rule-based as the stitching of programming schedules is performed in entirety at the time of scheduling; for live input stream manifests, stitching is performed on loop; no manifest unit is stored in the data store 206 without stitching; pre-encoded media assets/live input streams are never indexed but read at time of stitching in the data store 206; and only live differential schedules in the data store 206 are stitched.

Figure 2B:
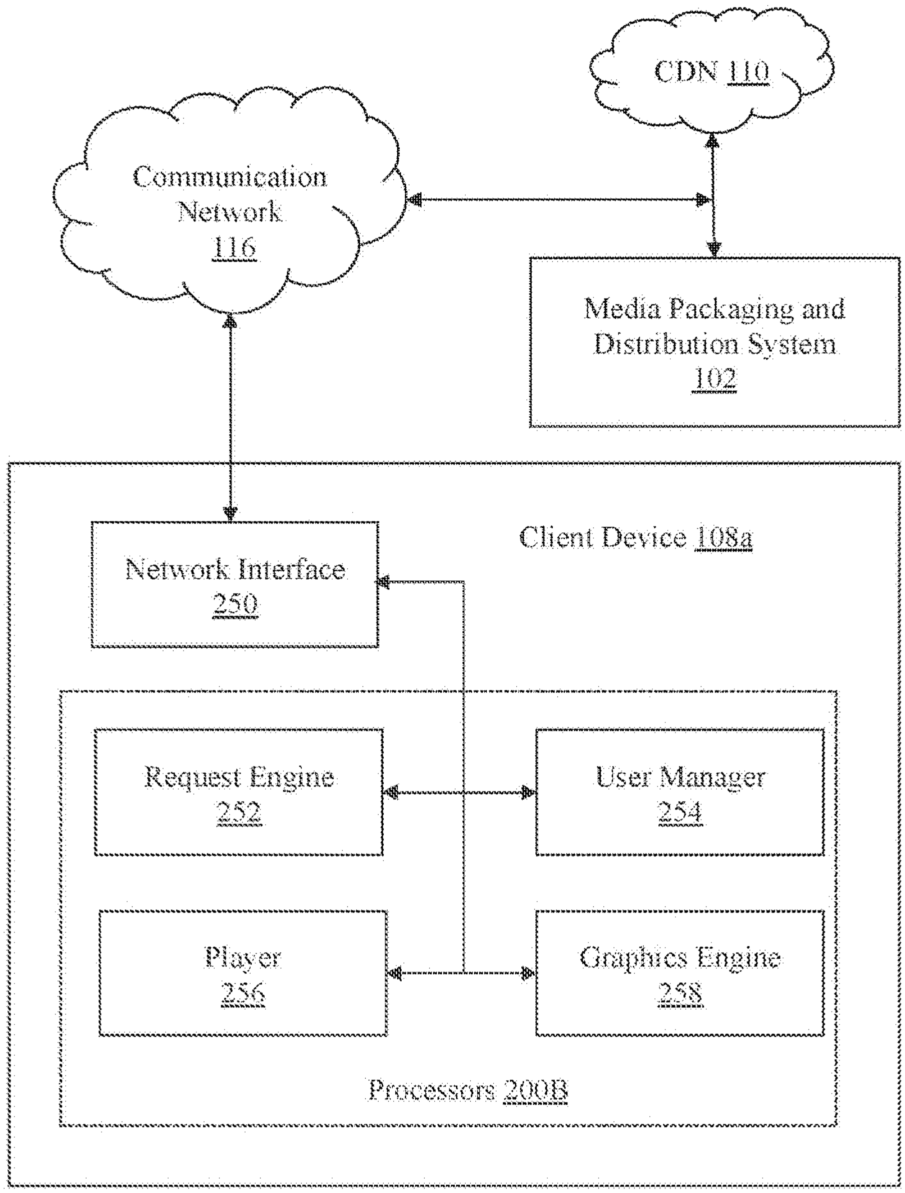
FIG. 2B is a block diagram that illustrates an exemplary client device, in accordance with an exemplary embodiment of the present disclosure.

FIG. 2B is a block diagram that illustrates an exemplary client device, in accordance with an exemplary embodiment of the present disclosure. Referring to FIG. 2B, there is shown the client device 108*a* that comprises a network interface 250, and one or more processors 200B. FIG. 2A is described in conjunction with FIG. 3C. Specifically, FIG. 3C illustrates a third sequence diagram 300C for playback of a live output stream manifest generated by the manifest manipulation system 130 of FIG. 2A, in accordance with an exemplary embodiment of the disclosure.

The one or more processors 200B may include a request engine 252, user manager 254, a player 256, and a graphics engine 258, via at least one bus or circuitry within the client device 108*a*. The media presentation and distribution system 102 and the CDN 110 may be communicatively coupled, via the communication network 116, to the network interface 250 of the client device 108*a*. Although not shown in FIG. 2B, the one or more processors 200B May include one or more processors that may operate on instructions that may be stored in a memory present on the client device 108*a*.

The network interface 250 may comprise suitable logic, circuitry, and interfaces that may be configured to communicate with various computing components within the client device 108*a*. The network interface 250 may be implemented by use of known technologies to support wired or wireless communication of the various computing components of the client device 108*a* with peripheral components, such as the media presentation and distribution system 102 and the CDN 110. Components of the network interface 250 may include, but are not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer circuitry. Additionally, the network interface 250 may operate as a switch or a router of communication signals to dedicated components of the client device 108*a*.

The request engine 252 may comprise suitable logic, circuitry, and interfaces that may be configured to transmit at least one client request to the media presentation and distribution system 102 and receive responses for the transmitted requests and, permissions and/or rights over the programming media content. The at least one client request may be transmitted to perform at least one operation on the client device 108*a*. The request engine 252 may be communicatively coupled to the network interface 250 that may be further coupled to an I/O interface (not shown) of the client device 108*a*. The user 118*a*, associated with the client device 108*a*, may provide an interaction at a display view of the client device 108*a*, via the I/O interface, such as a microphone, a keyboard, touch-screen, or a mouse pad. The network interface 250 may communicate the corresponding selection from/to the request engine 252. In response to the received interaction, the request engine 252 may identify a request within the received interaction and generate a corresponding request that may be defined as per a communication protocol specified for the client device 108*a* and other peripheral devices.

The user manager 254 may comprise suitable logic, circuitry, and interfaces that may be configured to manage processes and/or requests that may be associated with the at least one preference, activities (or footprints), interaction, or profile of the user 118*a*. Such preferences, activities, interaction, or profile may be stored and managed as user-related data in a user database. The user-related data may be stored as a structured and relational data, or an unstructured and non-relational data in the user database. Every time the user 118*a* requests, via the client device 108*a*, to access the preferred programming media content, the request may be stored at the user manager 254. The user manager 254 may be configured to authenticate the user 118*a* upon receiving such request, via the network interface 250. Additionally, the user manager 254 may be configured to facilitate transactions or payments, in conjunction with a payment engine (not shown), for at least one product or service offerings, promoted via the one or more non-programming media assets. The user database may be configured to store and manage the user-related data in real-time. The user-related data may comprise at least a set of user-authentication data, subscription data, one or more user-preferences, and associated interactions with the presented one or more non-programming media content at the client device 108*a*. A footprint of the user 118*a* defines the activities of the user 118*a* that may be stored in the user database in real-time.

The player 256 may comprise suitable logic, circuitry, and interfaces that may be configured to process the exemplary live output stream manifest 222*a* comprising manifest segments of live input streams and/or pre-encoded media assets. Accordingly, the player 256 may be configured to generate a corresponding live media output stream. Such live media output stream may comprise audio, video, images, or a combination thereof that may correspond to the live input stream and/or pre-encoded media asset. The audio may include an external media, an audio recorded from a microphone, or an application-specific audio resource. Video may include an external media, a video recorded from peer camera, or application-specific video resources (for example, interactive animations). The player 256 may be further configured to communicate the live media output stream to the graphics engine 258 for rendering media content.

The graphics engine 258 may comprise suitable logic, circuitry, and interfaces that may be configured to perform graphical computations for presentation of the programming media content and non-programming media content. Such graphical computations may be performed by the graphics engine 258, in conjunction with computational resources of a graphics processing unit (GPU). The graphics engine 258 may utilize the computational resources of the GPU to perform modifications in the display view of the client device 108*a*, encoding of the programming media content and non-programming media content, or rasterizing overlay graphics (such as, logos or bugs) over selected frames of the programming media content. At least a media encoder and a media decoder may be present in the graphics engine 258 that may be programmatically configured via a defined circuitry to operate on the programming media content and non-programming media content. The graphics engine 258 may be invoked to execute such graphical operations to manage the display view of the non-programming media content within (or over) the programming media content. Typically, the graphics engine 258 comprises of a geometry processing unit, a rasterization unit, and a special function register (SFR).

The graphics engine 258 may be configured on the client device 108*a* and may be communicatively coupled to a display circuitry of the display device. It may be noted that the graphics engine 258 may be shown to be integrated with the client device 108*a* in FIG. 1. However, the graphics engine 258 may be present on a cloud or a remote application server and communicatively coupled with the client device 108*a*, without deviation from the scope of the disclosure.

In operation, a URL pointing to an endpoint, such as the live output stream manifest in the CDN 110, may be received at the client device 108*a* for playback. As described above, the live output stream manifest includes the set of disparate manifest units, each comprising a referenced media segment (as absolute or relative path to a file or URL) and one or more manifest directives associated with the media segment or the placement of the media segment within the live output stream manifest. The manifest directives may be URLs or paths (which may be absolute or relative) to specific binary media constituting a portion of the media content. Having the endpoint instead of a static file may act as a logical gateway to the media content, where decisions can now be made in real-time. The URL pointing to an endpoint may also include an identifier, which may point to the live media output stream in question as well as its underlying programming schedule.

In accordance with an embodiment, the player 256 may be configured to fetch the live output stream manifest. The player 256, in conjunction with the graphics engine 258, may be configured to select a rendition within the live output stream manifest and begin to playout the rendition.

In accordance with the third sequence diagram 300C, there is illustrated a playback request sixth loop 316 for each target duration, the client device 108*a* may be configured to generate a client request for the exemplary live output stream manifest 222*a* based on a set of client parameters. The set of client request parameters may be received or inferred from the client device 108*a*. The client request may be transmitted to the CDN 110 (S31). The CDN 110 may obtain the stream ID corresponding to the request and further transmit the client request with the stream ID to the load manager 210 for further assignment (S32). The requests to the CDN 110 and the load manager 210 may include the set of client request parameters in a URL or a header.

The load manager 210, based one of the various protocols, such as round-robin protocol, may assign the received client request to one of the plurality of assembling engines 208*a*, . . . , 208*n*, such the assembling engine 208*a*, in the dynamic assembly pool 208 (S33). The assembling engine 208*a* may be configured to generate a query for the data store 206 based on the stream ID and current time range (S34). The assembling engine 208*a* may also include one or more parameters from the set of client request parameters within the generated query for the data store 206. The data store 206 may return the ordered set of indexed disparate manifest units 220 with manifest unit headers to the assembling engine 208*a* (S35). The assembling engine 208*a* may return the set of indexed disparate manifest units 220 with manifest unit headers to the CDN 110 (S36) as-is. In accordance with an embodiment, the CDN 110 may cache the exemplary live output stream manifest 222*a* of generic stream type (corresponding to 1:n stream/users, i.e. one stream for multiple users type) for one target duration (S37) before transmission to the plurality of users 118. In accordance with another embodiment, corresponding to 1:1 stream/user type (i.e. one stream for one user), the CDN 110 may not cache the exemplary live output stream manifest 222*a* for one target duration. The CDN 110 directly transmits the exemplary live output stream manifest 222*a* of personalized stream type for one target duration to the client device 108*a* (S38).

The player 256 at the client device 108*a* may playback a first portion of live media output stream corresponding to the first portion of the received exemplary live output stream manifest 222*a* for one target duration (S39). Following the playback of the first portion of the live media output stream, next client request may be automatically generated for playback of subsequent portions of the live media output stream till the entire live media output stream is played back.

Figure 4A:
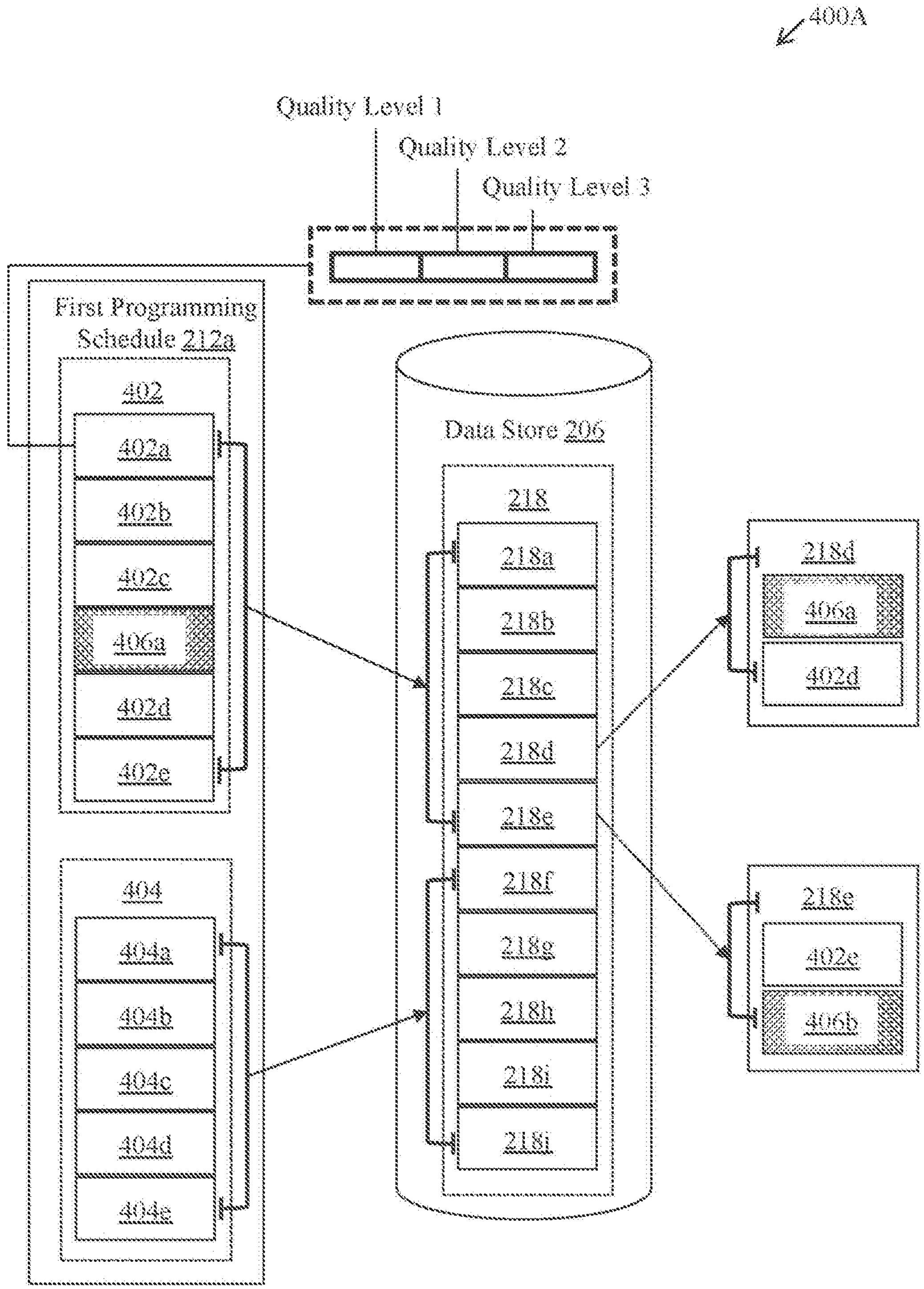
FIG. 4A illustrates a block diagram for exemplary source manifests and an exemplary collection of disparate manifest units obtained based on processing of an exemplary source manifest by the manifest manipulation system of FIG. 2A, in accordance with an exemplary embodiment of the disclosure.

FIG. 4A illustrates a block diagram 400A for exemplary source manifests and an exemplary collection of disparate manifest units obtained based on processing of the exemplary source manifests by the manifest manipulation system 130 of FIG. 2A, in accordance with an exemplary embodiment of the disclosure.

In accordance with the block diagram 400A, there is shown a first source manifest 402 and a second source manifest 404 in the first programming schedule 212*a*, which may be processed by the schedule processing pool 204. The first source manifest 402 and the second source manifest 404 may be collectively referred to as the source manifest 216, as introduced in FIG. 2A. The first source manifest 402 may include a SCTE message 406*a*. There is further shown an exemplary collection of disparate manifest units 218 obtained based on processing of the first source manifest 402 and the second source manifest 404 by the manifest manipulation system 130 of FIG. 2A.

The first source manifest 402 may include a first set of manifest segments, for example five manifest segments 402*a*, 402*b*, 402*c*, 402*d*, and 402*e*. The second source manifest 404 may comprise a second set of manifest segments, for example five manifest segments 404*a*, 404*b*, 404*c*, 404*d*, and 404*e*. In accordance with an exemplary scenario when the playlist of media content includes one live input steam and one pre-encoded media asset, the first source manifest 402 may correspond to the live input stream and the second source manifest 404 may correspond to the pre-encoded media asset. The playlist of media content may be included in the first programming schedule 212*a*, as introduced in FIG. 2A. Thus, the playlist of media content encapsulates the first source manifest 402 and the second source manifest 404. It should be noted that the above exemplary scenario should not be construed to be limiting, and the source manifest 216 may include more than two manifests and correspond to live input streams, pre-encoded media assets, or a combination thereof, based on the exemplary set of client request parameters 224*a* (corresponding to the initial or updated client request) or exemplary additional set of client request parameters 224*b* (corresponding to the additional client request), without any deviation from the scope of the disclosure.

Each of the first source manifest 402 and the second source manifest 404 may correspond to a text-based instruction set that provides information about which and where to retrieve media content segments corresponding to the live input stream and the pre-encoded media asset respectively, to play next. Each of the first source manifest 402 and the second source manifest 404 may enlist manifest segments that make up the full length of the media content for the client device 108*a*. Each of the first source manifest 402 and the second source manifest 404 may also include and/or specify additional information to facilitate the player at the client device 108*a* to transition smoothly between the live input stream and the pre-encoded media asset. Each of the first source manifest 402 and the second source manifest 404 may be used for creating the playlist of media content and/or for interrupting the media content with non-programming media content and then resuming the media content.

Each manifest segment from the first source manifest 402 and the second source manifest 404 may correspond to a URL or a path (which may be absolute or relative) to a specific binary media constituting a portion of a larger media content. By way of example, the segmentation may be executed by a segmenting system (for example a live stream encoder/packager and/or a content encoder/packager (not shown)) during a preparation stage of the media assets. The encode stage may create various quality levels and the package stage segments the content into the short segments, and produces the correct format, such as TS, fMP4, or CMAF and encrypts the media content to prevent piracy.

In accordance with an embodiment, the first source manifest 402 and the second source manifest 404 may be segmented into consistent length manifest segments, for example, 10 seconds segments. It may be advantageous to have a consistent and smaller file size of the segments to be able to quickly push to the CDN 110, and also for quick downloading by a player at the end-user side, such as on the plurality of client devices 108. However, it should be understood that various changes may be made, and segments of different file sizes (or lengths) may be possible without departure from the scope of the present disclosure. Further, other streaming protocols may require a different processing of the media content. Thus, the scope of the disclosure should not be limited, and the processing or preparation of the media content may be possible using different delivery methods, streaming protocols, or distribution system, known in the art. Further, instead of the live input stream and pre-encoded media asset arranged, as shown, different arrangements per the first programming schedule 212*a* may be possible with respect to interstitial content items, such as targeted non-programming media content and customized programming media content.

In accordance with an embodiment, each segment of the first source manifest 402 and the second source manifest 404 may be further processed to be stored at various quality levels, and content encryption modes for the purposes of ABR streaming and digital rights management. For example, the manifest segment 402*a* may be stored in a plurality of quality levels, for example, high definition (HD), high dynamic range (HDR) video, or different quality levels, such as Quality Level 1, Quality Level 2, and Quality Level 3 (as illustrated in FIG. 4A with respect to the manifest segment 402*a*), in accordance with specified pixel resolutions, bitrates, frame rates, and/or sample frequencies. Therefore, each of the media content is encoded, segmented, and stored with the plurality of quality levels in a media content master storage system 134. The media content may be re-used to create new channels, such as a new live media output stream, without having to re-encode a selected live input stream or a pre-encoded media asset when a new live media output stream is created using the live input stream or the pre-encoded media asset.

It should be understood that media packaging for different delivery methods (such as analog terrestrial broadcast, digital terrestrial broadcast, direct-to-home satellite broadcast, cable, other Internet Protocol (IP)-based delivery methods, over-the-top television (OTT)), different streaming protocols, or distribution system, may be different. The media content may be prepared to be viewed by one or more of the plurality of client devices 108, based on at least the desired delivery method, delivery conditions, content protection requirements, to satisfy operational and technical requirements, as needed. The operational and technical requirements may include, but are not limited to, media encoding, media segmentation, programming schedule (or manifest) creation or manipulation requirements, desired media encryption, and/or metadata signaling requirements. For example, in certain scenarios and for certain media content delivery methods, network bandwidth, network conditions, or device-type where the media content is to be consumed may not be variable or known in advance. In such a case, creating different quality levels for same media content may not be required. Further, based on different operational and technical requirements, publishing of the live media output stream may be different. The media content that is prepared and distributed may include both the programming media content, such as long-form presentations, short-form presentations, news or sporting events; and non-programming media content, such as paid advertisements, public service advertisements, or promotional material.

Referring to FIG. 4A, the first source manifest 402 and/or the second source manifest 404 may include one or more content placement opportunities. The one or more content placement opportunities may include, but are not limited to, non-programming indicators, such as ad break locations, graphical treatment indicators, such as overlay markers/triggers, programming indictors, such as a SCTE-35 message and a personalized content opportunity. For example, the first source manifest 402 may include a SCTE message 406*a* that is a programming indicator that may signal program start and end. The SCTE message 406*a* may segment the first source manifest 402 based on which media packaging and distribution system 102 may add, change, or remove different parts of the programming media content corresponding to the first source manifest 402 depending on its needs, for example blacking out a scene of a movie.

In in conjunction with FIG. 2A, the first source manifest 402 and the second source manifest 404 in the first programming schedule 212*a*, may be ingested and processed by the set of discrete service engines 204*a*, . . . , 204*n* in the schedule processing pool 204. Based on the processing, the exemplary collection of disparate manifest units 218, such as ten disparate manifest units 218*a*, . . . , 218*j*, may be obtained and stored as the indexed disparate manifest units in the data store 206. The exemplary collection of disparate manifest units 218 may include disparate manifest units based on the number of disparate manifest segments in the first source manifest 402 and the second source manifest 404. For example, the exemplary collection of disparate manifest units 218 may include ten disparate manifest units 218*a*, . . . , 218*j* corresponding to five manifest segments 402*a*, 402*b*, 402*c*, 402*d*, and 402*e* from the first source manifest 402 and five manifest segments 404*a*, 404*b*, 404*c*, 404*d*, and 404*e* from the second source manifest 404.

Each of the ten disparate manifest units 218*a*, . . . , 218*j* may include a corresponding manifest segment referencing a media segment (as absolute or relative path to a media file or a URL) and one or more manifest directives. For example, the first disparate manifest unit 218*a* may include the first manifest segment 402*a* of the first source manifest 402. Similarly a seventh disparate manifest unit 218*g* may include the second manifest segment 404*b* of the second source manifest 404.

Further, each of the ten disparate manifest units 218*a*, . . . , 218*j* may include one or multiple manifest directives associated with corresponding media segment or a placement of the media segment within the source manifest 216. For example, a first manifest directive may correspond to a SCTE message 406*a* (corresponding to a SCTE-35 marker) associated with the fourth manifest segment 402*d* of the first source manifest 402. Similarly, a second manifest directive may correspond to a discontinuity marker 406*b* associated with the fifth manifest segment 402*e* of the first source manifest 402. The discontinuity marker 406*b* may be automatically inserted by one of the set of discrete service engines 204*a*, . . . , 204*n* at the end of the first source manifest 402. Furthermore, label of each of the ten disparate manifest units 218*a*, . . . , 218*j* may include a corresponding manifest unit header, as illustrated in FIG. 4A.

The ten disparate manifest units 218*a*, . . . , 218*j* may be stored in the data store 206 as indexed disparate manifest units based on a set of indexing parameters. The set of indexing parameters may comprise, for example, a scheduled playout time, multiple live media output stream identifiers defined in the first programming schedule 212*a*, and a sequence of the collection of the ten disparate manifest units 218*a*, . . . , 218*j* defined in the source manifests. It should be noted that the number and type of manifests and manifest segments in the source manifest 216 is not limited to the first source manifest 402 and the second source manifest 404. The number and type of manifests and manifest segments may vary based on client request parameters, without any deviation from the scope of the disclosure.

Figure 4B:
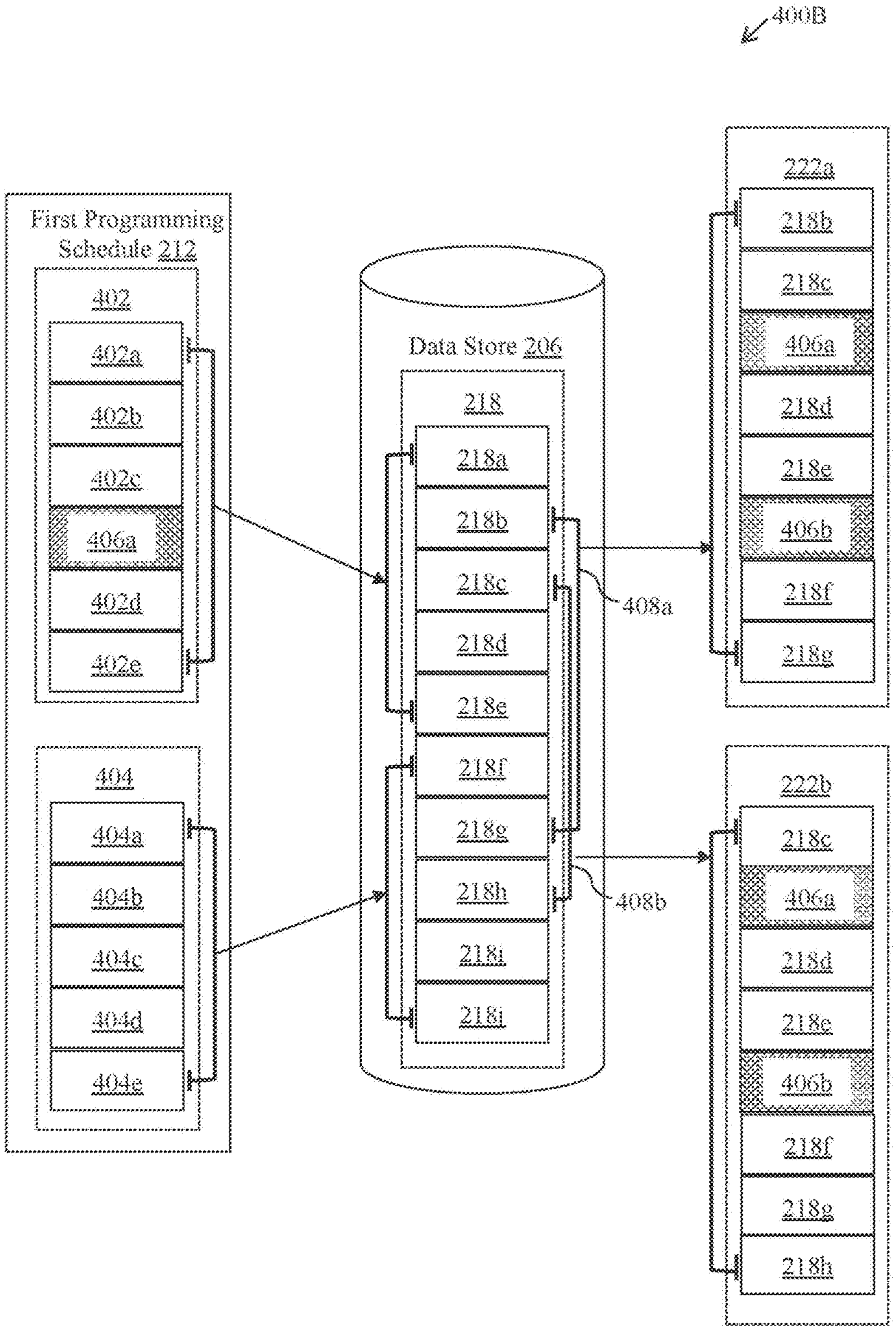
FIG. 4B illustrates a block diagram for an exemplary source manifest, an exemplary collection of disparate manifest units, and an exemplary set of disparate manifest units retrieved by the manifest manipulation system of FIG. 2A in response to a query based on a set of client request parameters, in accordance with an exemplary embodiment of the disclosure.

FIG. 4B illustrates a block diagram 400B for exemplary source manifests, an exemplary collection of disparate manifest units, and an exemplary set of disparate manifest units retrieved by the manifest manipulation system 130 of FIG. 2A in response to a query based on the set of client request parameters, in accordance with an exemplary embodiment of the disclosure.

In accordance with the block diagram 400B, there is shown the first source manifest 402 and the second source manifest 404 in the first programming schedule 212*a*, which may be processed by the schedule processing pool 204. Based on the processing, the collection of disparate manifest units 218, such as ten disparate manifest units 218*a*, . . . , 218*j*, may be obtained and stored as the indexed disparate manifest units in the data store 206. In response to a first client request and associated client request parameters, six disparate manifest units 218*b*, . . . , 218*g*, may be retrieved from the data store 206 by the dynamic assembly pool 208 based on a query. In such embodiment, six disparate manifest units may be retrieved as the manifest window size is defined as six in the client request parameters.

In accordance with an embodiment, the retrieval of the six disparate manifest units 218*b*, . . . , 218*g* from the data store 206 may be performed just-in-time based on the query that corresponds to the client request parameters. The six disparate manifest units 218*b*, . . . , 218*g* may correspond to the exemplary live output stream manifest 222*a* that includes the two manifest directives, i.e., the SCTE message 406*a* (associated with the fourth manifest segment 402*d* of the first source manifest 402) and the discontinuity marker 406*b* (associated with the fifth manifest segment 402*e* as the fifth manifest segment 402*e* is the last manifest segment of the first source manifest 402).

In accordance with an embodiment, the exemplary live output stream manifest 222*a* may be transmitted to the client device 108*a* in a sequence defined in the first programming schedule 212*a*, the client request parameters, and/or the set of indexing parameters. In such embodiment, the six disparate manifest units 218*b*, . . . , 218*g* may be transmitted in entirety, groups of various sizes, or one-by-one during the current iteration only. Thus, in such embodiment, the exemplary live output stream manifest 222*a* may be transmitted to the client device 108*a* as a VOD content.

In accordance with another embodiment, the exemplary live output stream manifest 222*a* may requested iteratively by the client device 108*a* in a sequence defined in the first programming schedule 212*a*, the client request parameters, and/or the set of indexing parameters. In such embodiment, a new disparate manifest unit, such as the disparate manifest unit 218*h*, may be added to the six disparate manifest units 218*b*, . . . , 218*g* in the manifest window during next iteration. In such manner, new disparate manifest units may be continually added to the six disparate manifest units 218*b*, . . . , 218*g* in the manifest window during subsequent iterations. Thus, in such embodiment, the exemplary live output stream manifest 222*a* may be transmitted to the client device 108*a* as a live event stream.

In accordance with yet another embodiment, the exemplary live output stream manifest 222*a* may requested iteratively by the client device 108*a* in a sequence defined in the first programming schedule 212*a*, the client request parameters, and/or the set of indexing parameters. In such embodiment, the new indexed disparate manifest unit, such as the disparate manifest unit 218*h*, may replace the older disparate manifest unit 218*b* from the six disparate manifest units 218*b*, . . . , 218*g* in the manifest window during next iteration. Therefore, next set of six disparate manifest units 218*c*, . . . , 218*h* may be obtained. In such manner, new disparate manifest units may be continually added to the six disparate manifest units 218*b*, . . . , 218*g* in the manifest window during subsequent iterations such that size of the manifest window remains as defined (such as six) or inferred based on the client request parameters. Thus, in such embodiment, the exemplary live output stream manifest 222*a* may be updated and transmitted to the client device 108*a* as a live media output stream.

Figure 5A:
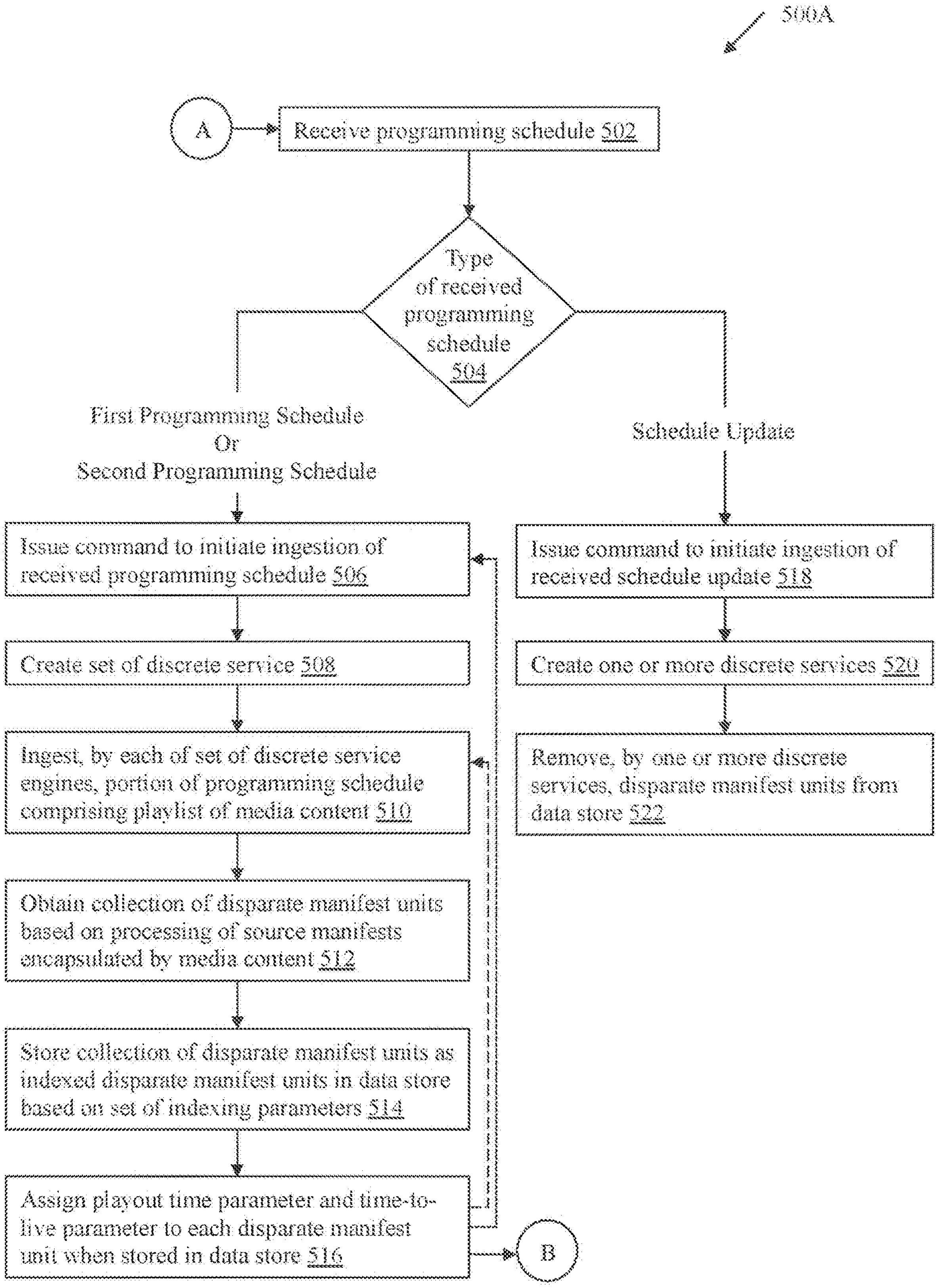
FIG. 5A depicts a first flowchart illustrating exemplary operations for ingestion of programming schedule comprising playlist of media content by the manifest manipulation system of FIG. 2A, in accordance with various embodiments of the disclosure.

FIG. 5A depicts a flowchart 500A illustrating exemplary operations for ingestion of programming schedule comprising playlist of media content by the manifest manipulation system 130 of FIG. 2A, in accordance with various embodiment of the disclosure. FIG. 5A is described in conjunction with the FIGS. 2A, 3A and 3B.

At 502, a programming schedule may be received. In accordance with an embodiment, the publisher API 202 of the manifest manipulation system 130 may be configured to receive the programming schedule. In accordance with various embodiments, the programming schedule may be generated automatically by the scheduler system 122 or by a human producer.

In accordance with an embodiment, the received the programming schedule may comprise the playlist of media content and may correspond to one of the first programming schedule 212*a* or the second programming schedule 212*b*. Said differently, the first programming schedule 212*a* and the second programming schedule 212*b* may correspond to at least two categories of the programming schedule. Thus, the programming schedule may further correspond to other categories of programming schedules, without any deviation from the scope of the disclosure.

The media content may correspond to one or more pre-encoded media assets, one or more live input streams, or a combination thereof. The media content may encapsulate the source manifest 216 that corresponds to one or more pre-encoded media asset manifests, one or more live input stream manifests, or a combination thereof. In addition to the playlist of media content, the programming schedule may further include a start time and end time of each media content, one or more identifiers for the live media output stream, and additional playout parameters (for example, loop the playlist of media content until a specified time, loop the playlist of media content a specific number of times, and the like).

In accordance with an embodiment, the one or more identifiers for the live media output stream may correspond to a stream identifier (i.e., stream_id) of the live media output stream or an updated live media output stream. In such embodiment, the programming schedule may be an initial programming schedule referred to as the first programming schedule 212*a*. In accordance with another embodiment, the one or more identifiers for the live media output stream may correspond to a combination of the stream identifier (i.e., stream_id) of the live media output stream and a parent identifier (i.e., parent_stream_id) of a parent live media output stream. In such embodiment, the programming schedule may be one of a branched programming schedule, an updated programming schedule, or other such ancillary programming schedule, referred to as the second programming schedule 212*b*. In accordance with an embodiment, the second programming schedule 212*b* may correspond to a differential programming schedule that indicates a "delta" programming schedule, i.e. a unique alternate or additional media content, that may be integrated with the first programming schedule 212*a*. Accordingly, a personalized live media output stream may be generated. The second programming schedule 212*b* may be generated based on a user interaction at a decision point encountered by the player 256 at the client device 108*a* during a playout of the current iteration of the live output stream manifest. The decision point may correspond to a manifest directive, such as the SCTE message 406*a*, in a disparate manifest unit of the live output stream manifest. The decision point may be defined by a programming indicator, an interactive element, a non-programming indicator, and/or a programming media content marker. Examples of the programming indicator may include, but are not limited to, an SCTE marker, an end of a media program segment, or manifest directive. Examples of the interactive element may include, but are not limited to, user selection of an Ad preference, skipping next ad, skipping future ads, watching ads immediately instead of watching at future ad locations, or personalized content preferences. In certain embodiments, the examples may include restarting the media content, skipping to a future schedule's media content, time-shifting within the media content and resuming playback. Examples of the non-programming indicator may include, but are not limited to, ad break locations, graphical treatment indicators, such as overlay markers/triggers, and programming indicators and personalized content opportunity, which may be comprised of manifest directives, such as the SCTE message 406*a*. Examples of the programming media content marker may include, but are not limited to, opening credits, closing credits, timing, and previous episode recaps.

The branched programming schedule may be a new (or alternate) portion of the initial programming schedule that may be determined by the scheduler system 122 and/or the personalization system 126. Branching may be scheduled to occur on a per-playback-session level, allowing for user-specific live media output streams to be generated from a more common schedule, i.e. the initial programming schedule (or the first programming schedule 212*a*). The new portion of the initial programming schedule may be determined to cater to various use cases, such as viewer retention, ad insertion, premium content, and break-ins. The updated programming schedule may correspond to scenarios where the manifest manipulation system 130 receives an updated source manifest indicating a replacement or modification of one or more of the playlist of media content. It should be noted that the examples of the second programming schedule 212*b* are not limited to the branched programming schedule and the updated programming schedule only. In other embodiments, the second programming schedule 212*b* may correspond to other such ancillary programming schedules, without any deviation from the scope of the disclosure.

In accordance with an alternate embodiment, the received programming schedule may correspond to a schedule update. In one scenario, the schedule update may include an updated playlist of media content from which one or more pre-encoded assets, one or more live input streams, or a combination thereof is removed. In such case, the schedule update may comprise playout IDs of each of the one or more pre-encoded assets one or more live input streams, or a combination thereof to be removed. The one or more pre-encoded assets, one or more live input streams, or a combination thereof may be removed by the scheduler system 122 based on, for example, an updated set of client request parameters corresponding to a user input at a client device, such as the client device 108*a*, to skip a portion of the media content during playout or restricted media content based on geographical location of the client device 108*a*. In another scenario, the schedule update may include an updated playlist of media content with an updated start time and end time. In such case, the start time and end time of the schedule update may reference the change to the initial programming schedule.

At 504, type of the received programming schedule may be determined. In accordance with an embodiment, when the received programming schedule corresponds to one of the first programming schedule 212*a* or the second programming schedule 212*b*, control passes to step 506. In accordance with another embodiment, when the received programming schedule corresponds to the schedule update, control passes to step 518.

At 506, a command may be issued to initiate ingestion of the received programming schedule. In accordance with an embodiment, the publisher API 202 of the manifest manipulation system 130 may be configured to issue the command to the schedule processing pool 204 to initiate the ingestion of the received programming schedule. In such embodiment, the received programming schedule may be one of the first programming schedule 212*a* or the second programming schedule 212*b*.

The ingestion may correspond to a process of separating the media content of a source manifest, which comprises multiple media segment references and associated manifest directives, into multiple disparate manifest units, such as the collection of disparate manifest units 218. The ingestion may be initiated by the publisher API 202 of the manifest manipulation system 130 by issuing the command to the schedule processing pool 204 upon the receipt of the programming schedule comprising the source manifest, such as the source manifest 216.

At 508, the set of discrete service engines 204*a*, . . . , 204*n* may be created. In accordance with an embodiment, the schedule processing pool 204 of the manifest manipulation system 130 may be configured to create the set of discrete service engines 204*a*, . . . , 204*n*. The schedule processing pool 204 may receive the command issued by the publisher API 202 of the manifest manipulation system 130 to create the set of discrete service engines 204*a*, . . . , 204*n*.

At 510, a portion of the programming schedule comprising the playlist of media content may be ingested by each of the set of discrete service engines 204*a*, . . . , 204*n*. In accordance with an embodiment, each of the set of discrete service engines 204*a*, . . . , 204*n* from the schedule processing pool 204 may be configured to ingest corresponding portion of the received programming schedule, such as one of the first programming schedule 212*a* or the second programming schedule 212*b*, comprising a playlist of media content. In other words, each of the set of discrete service engines 204*a*, . . . , 204*n* may divide the programming schedule into portions and ingests only the corresponding portion of the programming schedule.

Each of the set of discrete service engines 204*a*, . . . , 204*n* from the schedule processing pool 204 may be configured to read the corresponding portion of the source manifest 216 (included in the programming schedule). Each of the set of discrete service engines 204*a*, . . . , 204*n* may be further configured to pre-process the corresponding portions of the programming schedule. In accordance with an exemplary embodiment, each discrete service engine from the set of discrete service engines 204*a*, . . . , 204*n* may be configured to ingest a specific type of media content from the programming schedule comprising the paylist of media content. For example, the first discrete service engine 204*a* may be assigned to video A, the second discrete service engine 204*b* may be assigned to video B, the third discrete service engine 204*c* may be assigned to video C, and so forth. In accordance with another exemplary embodiment, each discrete service engine from the set of discrete service engines 204*a*, . . . , 204*n* may be configured to ingest a specific quality (such as resolution, bitrate, or the like) of media content from the playlist of media content in the programming schedule. In accordance with another exemplary embodiment, each discrete service from the set of discrete service engines 204*a*, . . . , 204*n* may be configured to ingest a different programming schedules at the same time. It should be noted that the above exemplary embodiments should not be construed to be limiting, and other such methods of ingestion of the received programming schedule may be possible without any deviation from the scope of the disclosure.

At 512, the collection of disparate manifest units 218 may be obtained based on processing of the source manifest 216 encapsulated by the media content. In accordance with an embodiment, the set of discrete service engines 204*a*, . . . , 204*n* from the schedule processing pool 204 may be configured to obtain the collection of disparate manifest units 218 based on processing of the source manifest 216 encapsulated by the media content. As illustrated in FIG. 4A, each manifest unit, such as the manifest unit 218*d*, from the collection of the disparate manifest units 218 may comprise a referenced media segment, such as the fourth manifest segment 402*d*, an associated manifest directive, such as the SCTE message 406*a*, and a manifest unit header, labeled as 218*d*. In accordance with an embodiment, the associated manifest directive may be applied during the playback of the media content at the client device 108*a*. Any additional manifest directives specified in the programming schedule that corresponds to the playout time of the media segment corresponding to a manifest unit may be added to the manifest unit. In accordance with another embodiment, each manifest unit from the collection of disparate manifest units 218 may be assigned a specific playout time relative to a position of corresponding media segment and the start of the media content, as defined in the programming schedule.

At 514, the collection of disparate manifest units 218 may be stored as indexed disparate manifest units in the data store 206 based on a set of indexing parameters. In accordance with an embodiment, the set of discrete service engines 204*a*, . . . , 204*n* from the schedule processing pool 204 may be configured to store the collection of disparate manifest units 218 as indexed disparate manifest units in the data store 206 based on the set of indexing parameters. Examples of the set of indexing parameters may include, but are not limited to, a scheduled playout time, live media output stream identifiers defined in the programming schedule, and a sequence of the collection of the disparate manifest units 218 defined in the source manifest 216.

At 516, a playout time parameter, a time-to-live parameter may be assigned to each disparate manifest unit when stored in the data store 206. In accordance with an embodiment, the set of discrete service engines 204*a*, . . . , 204*n* from the schedule processing pool 204 may be configured to assign a playout time parameter and a time-to-live parameter to each disparate manifest unit when stored in the data store 206. The playout time parameter may be relative to a position of a corresponding referenced media segment and a start time of the media content as defined in the programming schedule. The time-to-live parameter may be relative to an end time of the media content defined in the programming schedule. Accordingly, the data store 206 may be configured to persist the indexed collection of disparate manifest units 218 until a specified expiration date based on the time-to-live parameter. Subsequently, the set of discrete service engines 204*a*, . . . , 204*n* auto-terminates.

The exemplary operations as per the method steps 506 to 516 for ingestion of programming schedule and subsequent storage of the collection of disparate manifest units 218 in the data store 206 may correspond to an event, such as receipt of the first programming schedule 212*a*, the second programming schedule 212*b*, or the schedule update, in accordance with various embodiments of the disclosure. The exemplary operations as per the method steps 506 to 516 are further supported by the first sequence diagram 300A and the second sequence diagram 300B, as described in FIGS. 3A and 3B respectively.

For example, in accordance with an embodiment, the programming schedule may correspond to the first programming schedule 212*a* and the source manifest 216 in the first programming schedule 212*a* corresponds to multiple pre-encoded media asset manifests only. In such embodiment, as illustrated by the dotted arrow line, the method steps 506 to 516 may be executed once for each pre-encoded media asset manifest in accordance with the sequence of steps defined in the first loop 302 (FIG. 3A). Alternatively, the programming schedule may correspond to the second programming schedule 212*b* and the source manifest 216 in the second programming schedule 212*b* corresponds to multiple pre-encoded media asset manifests only. In such embodiment, as illustrated by the dotted arrow line, the method steps 506 to 516 may be executed for each pre-encoded media asset manifest in accordance with the sequence of steps defined in the fourth loop 310 (FIG. 3B).

In accordance with another embodiment, the programming schedule may correspond to the first programming schedule 212*a* and the source manifest 216 in the first programming schedule 212*a* corresponds to multiple live input stream manifests. In such embodiment, as illustrated by the dotted arrow line, the method steps 506 to 516 may be executed for each live input stream manifest, in accordance with the sequence of steps defined in the second loop 304 (FIG. 3A). Further, for each live input stream manifest, as illustrated by the long-dashed arrow line, the method steps 510 to 516 may be executed iteratively for each live input stream manifest, in accordance with the sequence of steps defined in the nested loop 306 (FIG. 3A). Alternatively, the programming schedule may correspond to the second programming schedule 212*b* and the source manifest 216 in the second programming schedule 212*b* corresponds to multiple live input stream manifests only. In such embodiment, as illustrated by the long-dashed arrow line, the method steps 510 to 516 may be executed iteratively for each live input stream manifest in accordance with the sequence of steps defined in the fifth loop 312 and the nested loop 314 (FIG. 3B).

In accordance with yet another embodiment, the programming schedule may correspond to the first programming schedule 212*a* and the source manifest 216 in the first programming schedule 212*a* corresponds to combination of one or more pre-encoded media asset manifests and live input stream manifests. In such embodiment, as illustrated by the dotted arrow line, the method steps 506 to 516 may be executed for each pre-encoded media asset manifest or live input stream manifest in accordance with the sequence of steps defined in the first loop 302 and the second loop 304 (FIG. 3A). Additionally, as illustrated by the long-dashed arrow line, the method steps 510 to 516 may be executed iteratively for each live input stream manifest in accordance with the sequence of steps defined in the nested loop 306 (FIG. 3A). Alternatively, the programming schedule may correspond to the second programming schedule 212*b* and the source manifest 216 in the second programming schedule 212*b* corresponds to combination of one or more pre-encoded media asset manifests and live input stream manifests. In such embodiment, the method steps 506 to 516 may be executed for each pre-encoded media asset manifest or live input stream manifest in accordance with the sequence of steps defined in the fourth loop 310 and the fifth loop 312 (FIG. 3B). Additionally, as illustrated by the long-dashed arrow line, the method steps 510 to 516 may be executed iteratively for each live input stream manifest, in accordance with the sequence of steps defined in the nested loop 314 (FIG. 3B).

At 518, a command may be issued to initiate ingestion of the received schedule update. In accordance with an embodiment, the publisher API 202 of the manifest manipulation system 130 may be configured to issue a command to initiate ingestion of the received schedule update. As described above, the schedule update may include the playout ID of each of the one or more pre-encoded assets one or more live input streams, or a combination thereof to be removed and/or the updated start time and end time.

At 520, one or more discrete service engines 2040, . . . , 204*z* may be created. In accordance with an embodiment, the schedule processing pool 204 of the manifest manipulation system 130 may be configured to create the one or more discrete service engines 2040, . . . , 204*z*.

At 522, one or more disparate manifest units (for example, by playout ID and/or schedule start) may be removed from the collection of disparate manifest units 218 in the data store 206 by the one or more discrete service engines 2040, . . . , 204*z*. In accordance with an embodiment, the one or more discrete service engines 2040, . . . , 204*z* may be configured to remove the one or more disparate manifest units (for example, by playout ID and/or schedule start) from the collection of disparate manifest units 218 in the data store 206. Subsequently, the one or more discrete service engines 2040, . . . , 204*z* may terminate.

Figure 5B:
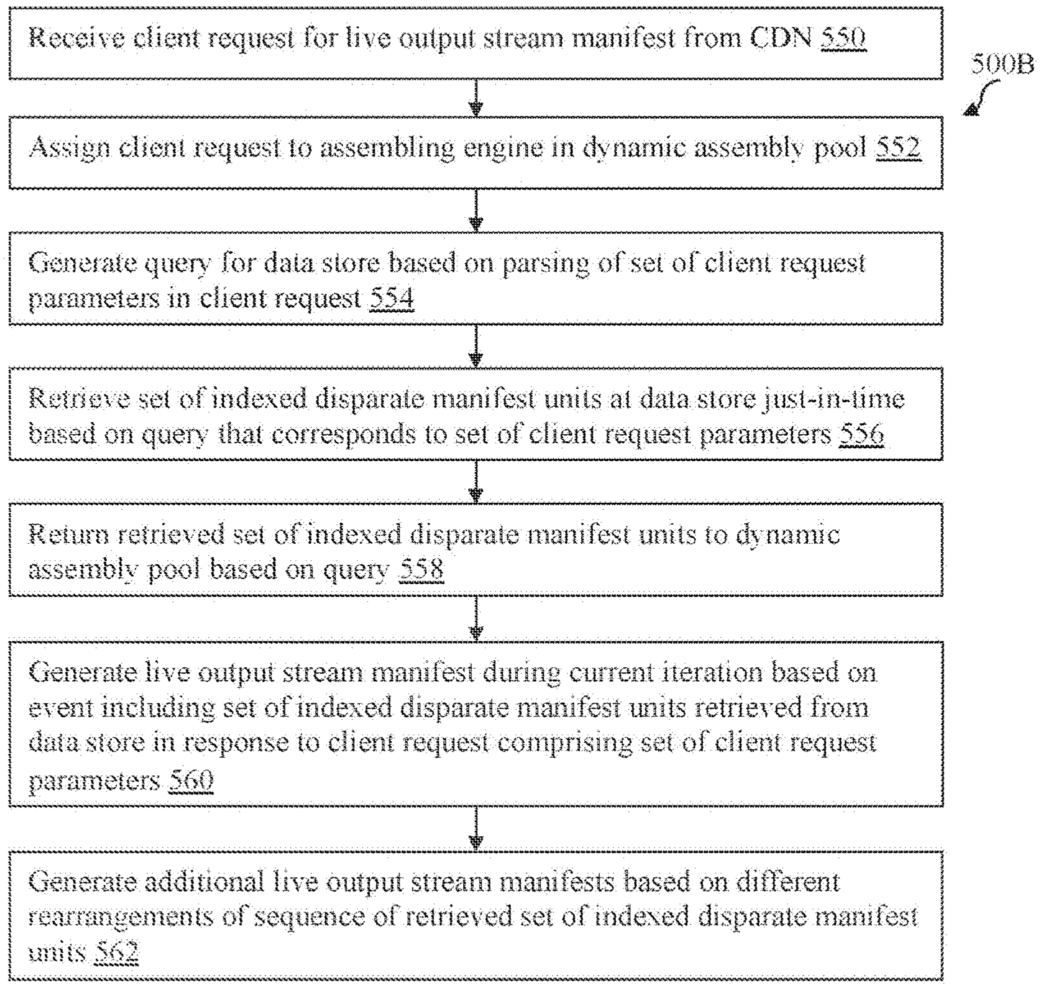
FIG. 5B depicts a second flowchart illustrating exemplary operations for playout of live output stream manifest generated by the manifest manipulation system of FIG. 2A, in accordance with various embodiments of the disclosure.

FIG. 5B depicts a second flowchart 500B illustrating exemplary operations for playout of live output stream manifest generated by the manifest manipulation system 130 of FIG. 2A, in accordance with various embodiments of the disclosure. FIG. 5B is described in conjunction with the FIGS. 2A and 3C. In accordance with an embodiment, method steps 550 to 562 depicted in the second flowchart 500B may be executed when the client request corresponds to an initial client request and the client request parameters correspond to the initial client request parameters for a current iteration, i.e. a single iteration for a VOD or a first iteration of a live stream or a live event stream. In accordance with another embodiment, method steps 550 to 562 depicted in the second flowchart 500B may be again executed when the client request corresponds to an updated client request and the client request parameters correspond to the updated client request parameters for subsequent iterations, i.e. next iterations of the live stream or the live event stream. Thus, the term "client request", described in the method steps 550 to 562, corresponds to both of the initial or updated client requests, and the term "set of client request parameters" corresponds to both of the initial or updated set of client request parameters for brevity unless otherwise stated.

At 550, a client request for a live output stream manifest may be received. In accordance with an embodiment, the load manager 210 may be configured to receive the client request for a live output stream manifest from the CDN 110. Basically, the client request may be generated by the player 256 or the client device 108*a* and received by the CDN 110. In accordance with an embodiment, the client request may comprise a set of client request parameters that further comprise a live media output stream identifier, a playout time, a manifest window size, and a type of live output stream manifest provided by the user 118*a* at the client device 108*a*. The live media output stream identifier may correspond to an identifier associated with corresponding manifest units of the live media output stream stored in the data store 206. The playout time may correspond to a playout time associated with corresponding manifest units stored in the data store 206. The manifest window that may correspond to a number of manifest units that may be included in the resulting response, i.e. the live output stream manifest. The type of live output stream manifest may be one of a live media output stream, live event stream, VOD stream, as desired by the user. The live media output stream may be an output stream with a moving manifest window that consists of a set number of manifest units that rotate with playout. The live event stream may be an output stream where the window of manifest units is appended as playout progresses. The VOD stream may be an output stream where the totality of the media content consisting of all manifest units are returned all at once.

In accordance with an embodiment, in addition to the above parameters, the client request may further comprise inferred parameters, such as a geolocation of the client device 108*a* and date/time at which the client request is generated.

At 552, the client request may be assigned to an assembling engine in the dynamic assembly pool 208. In accordance with an embodiment, the load manager 210 may be configured to assign the client request to the assembling engine, such as the assembling engine 208*a*, in the dynamic assembly pool 208. In accordance with an embodiment, the load manager 210 may be configured to assign the client request to the assembling engine based on one of the various protocols to balance request load across the plurality of assembling engines 208*a*, . . . , 208*n*. Examples of such protocols may include, but are not limited to Round-Robin protocol, Fixed order protocol, Random order protocol, Availability protocol, or Resource Availability protocol.

At 554, a query for the data store 206 may be generated based on parsing of the set of client request parameters in the client request. In accordance with an embodiment, the assembling engine, such as the assembling engine 208*a*, in the dynamic assembly pool 208 may be configured to generate the query for the data store 206 based on the parsing of the set of client request parameters in the client request. Thus, the query may include the set of client request parameters, such as the live media output stream identifier and the playout time, as query parameters for retrieval of manifest units. In absence of certain client request parameters, the assembling engine, such as the assembling engine 208*a*, in the dynamic assembly pool 208 may be configured to set default values. For example, if no playout time is specified in the client request, then the assembling engine, such as the assembling engine 208*a*, may use server-time of the client request instead. In another example, if no manifest window size is specified in the client request, then the assembling engine, such as the assembling engine 208*a*, may use a pre-configured default value instead.

At 556, the set of indexed disparate manifest units may be retrieved at the data store 206 just-in-time based on the query that corresponds to the set of client request parameters. In accordance with an embodiment, the data store 206 may be configured to retrieve the set of indexed disparate manifest units at the data store 206 just-in-time based on the query that corresponds to the set of client request parameters.

At 558, the retrieved set of indexed disparate manifest units may be returned to the dynamic assembly pool 208 based on the query. In accordance with an embodiment, the data store 206 may be configured to return the retrieved set of indexed disparate manifest units to the dynamic assembly pool 208 based on the query. The retrieved set of indexed disparate manifest units may be ordered in accordance with the playout time and a manifest unit sequence. The playout time and the manifest unit sequence may be defined in one of the source manifest, assigned during the ingestion of the programming schedule, or assigned during indexing of the collection of disparate manifest units 218 in the data store 206.

At 560, a live output stream manifest may be generated during current iteration based on event including the set of indexed disparate manifest units retrieved from the data store 206 in response to a client request comprising the set of client request parameters. In accordance with an embodiment, the assembling engine in the dynamic assembly pool 208 may be configured to generate the live output stream manifest during the current iteration based on the event including the set of indexed disparate manifest units retrieved from the data store 206 in response to the client request comprising the set of client request parameters.

In accordance with an embodiment, the dynamic assembly pool 208 may be configured to generate the live output stream manifest for the client device 108*a* for playback during the current iteration based on the event. In such embodiment, the event may correspond to the receipt of the client request in response to which the query is generated. The live output stream manifest may be generated for the client device 108*a* by the dynamic assembly pool 208 in a sequence defined in the programming schedule, the set of client request parameters, and/or the set of indexing parameters.

In accordance with another embodiment, the dynamic assembly pool 208 may be configured to return the live output stream manifest during the current iteration to the CDN 110. In accordance with an embodiment, the CDN 110 may be configured to transmit the live output stream manifest to the client device 108*a* in entirety during the current iteration for playback. In accordance with another embodiment, the CDN 110 may be configured to transmit the live output stream manifest to the client device 108*a* one by one in multiple iterations for playback. The CDN 110 may be configured to cache the live output stream manifest for one target duration based on the manifest window size, such as the six disparate manifest units 218*b*, . . . , 218*g*, as illustrated in FIG. 4B. The cached live output stream manifest may be transmitted to the client device 108*a* by the CDN 110 in a sequence defined in the programming schedule, the set of client request parameters, and/or the set of indexing parameters. The six disparate manifest units 218*b*, . . . , 218*g* in the live output stream manifest received at the client device 108*a* may be played back by the player 256. Remaining disparate manifest units may be received at the client device 108*a* in multiple iterations.

At 560, additional live output stream manifests may be generated based on different rearrangements of the sequence of retrieved set of indexed disparate manifest units. In accordance with an embodiment, the assembling engine in the dynamic assembly pool 208 may be configured to generate the additional live output stream manifests based on different rearrangements of the sequence of retrieved set of indexed disparate manifest units. In an exemplary scenario, such a rearrangement may be result of a user interaction at a decision point pertaining to skipping of a current chapter of a web series. As a result, the skipped portion of the manifest may be replaced by the upcoming disparate manifest units or alternate disparate manifest units. In other exemplary scenarios, the rearrangement of the sequence of retrieved set of indexed disparate manifest units may correspond to reordering the sequence of the disparate manifest units based on time-shifting within the current media content, to the past scheduled media content, or to the future scheduled media content.

It should be noted that for brevity, only current iteration for one target duration has been described in accordance with method steps 550 to 560. Subsequent iterations for next target durations may be performed in the similar manner as described above.

The exemplary operations as per the method steps 550 to 560 for the playout of live output stream manifest generated by the manifest manipulation system 130 may correspond to an event, such as a client request generated by the client device 108*a*, in accordance with an embodiment of the disclosure. The client request may correspond to an initial client request or an additional client request (corresponding to personalized live output stream manifests). The exemplary operations as per the method steps 550 to 560 are further supported by the third sequence diagram 300C, as described in FIG. 3C.

Figure 5C:
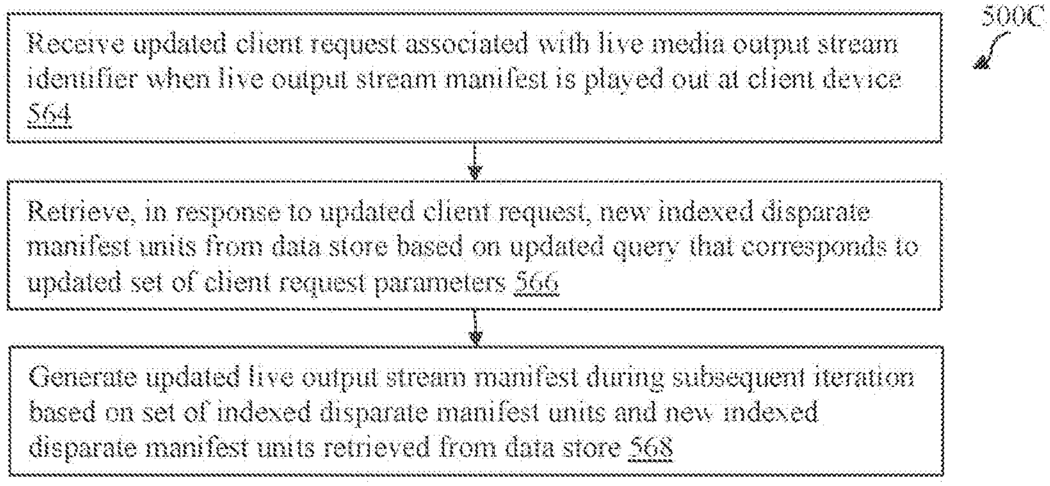
FIG. 5C depicts a third flowchart illustrating exemplary operations for generating an updated live output stream manifest by the manifest manipulation system, in accordance with various embodiments of the disclosure.

FIG. 5C depicts a third flowchart 500C illustrating exemplary operations for generating an updated live output stream manifest by the manifest manipulation system 130 of FIG. 2A, in accordance with various embodiments of the disclosure. FIG. 5C is described in conjunction with the FIGS. 2A and 4B.

At 564, an updated client request associated with the live media output stream identifier may be received when the live output stream manifest is played out at the client device, such as the client device 108*a*. In accordance with an embodiment, the dynamic assembly pool 208 may be configured to receive the updated client request associated with live media output stream identifier when the live output stream manifest is played out at the client device 108. The updated client request may be received by the dynamic assembly pool 208 in case the type of the live output stream manifest is a live media output stream with a moving manifest window or a live event stream, where the window of the disparate manifest units is appended as the playout progresses.

The updated client request may be associated with updated client request parameters. For example, in certain cases, the user may desire to update the size of the manifest window during live viewing of a sports event. Thus, the updated client request parameters may include new manifest window size explicitly defined by the user. In other cases, some parameters, for example current location and date/time, may be inferred based on the updated client request.

At 566, in response to the updated client request, new indexed disparate manifest units may be retrieved from the data store 206 based on the updated query that corresponds to the updated set of client request parameters. In accordance with an embodiment, the dynamic assembly pool 208 may be configured to retrieve, in response to updated client request, the new indexed disparate manifest units from the data store 206 based on the updated query that corresponds to the updated set of client request parameters.

At 568, the updated live output stream manifest may be generated during subsequent iteration based on the set of indexed disparate manifest units and the new indexed disparate manifest units retrieved from the data store 206. In accordance with an embodiment, the dynamic assembly pool 208 may be configured to generate the updated live output stream manifest during the subsequent iteration based on the set of indexed disparate manifest units and the new indexed disparate manifest units retrieved from the data store. In accordance with an embodiment, the dynamic assembly pool 208 may be configured to return the updated live output stream manifest during the subsequent iteration to the CDN 110, which in turn returns the updated live output stream manifest to the client device 108*a*. The updated live output stream manifest received by the client device 108*a* may be played by the player 256.

In accordance with an embodiment, the new indexed disparate manifest units may be continually added to the set of indexed disparate manifest units in the manifest window during subsequent iterations. In accordance with another embodiment, the new indexed disparate manifest units may replace older manifest units from the set of indexed disparate manifest units in the manifest window during subsequent iterations such that size of the manifest window remains as defined or inferred based on the client request parameters. Technically, the size of the player buffer is less than or equal to the size of the manifest window. Some players can use the entire manifest window and buffer the manifest segments of the entire content. While other players can buffer only a portion of the manifest segments in the manifest window.

In accordance with an embodiment, the updated live output stream manifest may be maintained in a manifest window that corresponds to a number of manifest segments that the player 256 can buffer. For example, as illustrated in FIG. 4B, corresponding to the exemplary live output stream manifest 222*a*, an initial state 408*a* of the manifest window is such that the manifest window encompasses the six disparate manifest units 218*b*, . . . , 218*g* during current iteration. However, corresponding to the updated live output stream manifest, the updated state 408*b* of the manifest window is such that the manifest window slides by one manifest unit and now encompasses the next six disparate manifest units 218*c*, . . . , 218*h* during subsequent iteration. It should be understood that the size of the manifest window may be other than six, as inferred or defined by the client request defined in the initial client request and/or the updated client request.

Figure 5D:
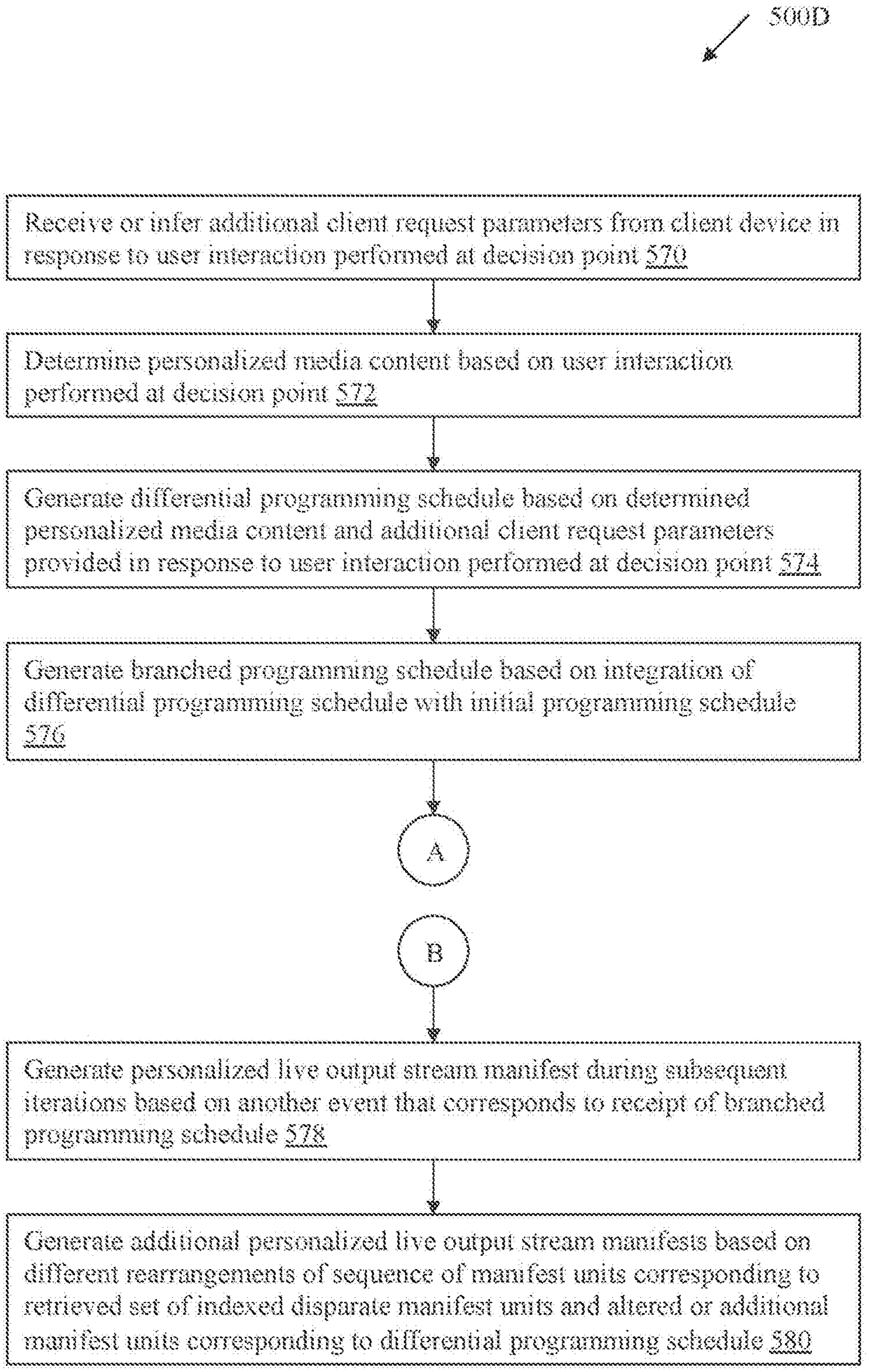
FIG. 5D depicts a fourth flowchart illustrating exemplary operations for generating a personalized live output stream manifest by the manifest manipulation system in conjunction with the media packaging and distribution system of FIG. 2A, in accordance with various embodiments of the disclosure.

FIG. 5D depicts a fourth flowchart 500D illustrating exemplary operations for generating a personalized live output stream manifest by the manifest manipulation system 130 in conjunction with the media packaging and distribution system 102 of FIG. 2A, in accordance with various embodiments of the disclosure. FIG. 5D is described in conjunction with the FIGS. 2A and 5A.

At 570, additional set of client request parameters may be received or inferred from a client device in response to a user interaction performed at a decision point. In accordance with an embodiment, the personalization system 126 may be configured to receive or infer the additional set of client request parameters from a client device, such as the client device 108*a*, in response to the user interaction performed at the decision point. In simplest terms, the decision point may correspond to a point in the live media output stream (being played back at the client device 108*a*) where media content can be altered.

The decision point may be encountered by the player 256 at the client device 108*a* during a playout of the current iteration of the live output stream manifest. The decision point corresponding to a manifest directive in a disparate manifest unit may be defined by a programming indicator, an interactive element, a non-programming indicator, and/or a programming media content marker. Based on the user interaction performed at the decision point, the personalization system 126 may determine a new (or personalized) portion of the first programming schedule 212*a* (i.e. the initial programming schedule) as the second programming schedule 212*b* (i.e. a differential programming schedule) to cater to various use cases, such as viewer retention, Ad insertion, premium content, and break-ins.

Exemplary scenarios corresponding to the viewer retention use case may include, but are not limited to, an alternate content in place of a live event (for example, a web series instead of a basketball game), highlight clips of previous plays before a live baseball game starts versus watching end of a series and waiting, offering a series' next episode instead of a scheduled different show, and offering content in relation to user preferences, location, and/or other metrics. Exemplary scenarios corresponding to the Ad insertion may include, but are not limited to, Ad targeting based on real-time live events, ad targeting based on the user preferences, location, and other metrics, ability to increase/decrease Ad load according to business rules (for example, binge rewards), and/or Ad targeting based on real-time live events. Exemplary scenarios corresponding to the premium content may include, but are not limited to, branching narratives/choose-your-own-adventure viewing style, access to deleted/alternate scenes in-line, and/or democratic viewing via user-voting on next episode. Exemplary scenarios corresponding to the break-ins may include, but are not limited to, breaking news interrupting content and/or notifications of a live event occurring on another live media output stream.

The additional set of client request parameters, as received by the personalization system 126, may comprise at least additional information, such as the live media output stream identifier (associated with the live output stream manifest) as parent stream identifier (i.e. parent_stream_id), a new live media output stream identifier, a new playout time, a manifest window size, and a type of live output stream manifest, based on the user interaction performed at the decision point. In accordance with an embodiment, the additional information may correspond to additional manifest units associated with personalizing the live output stream manifest with respect to the initial live output stream manifest.

In accordance with an embodiment, before real-time information can be gathered, the player 256 may require an embedded trigger to become aware that the decision point is upcoming. Such embedded trigger may be facilitated by including a programming indictor, in the form of a marker, such as the SCTE message 406*a*, into the live output stream manifest itself. When the player 256 encounters SCTE message 406*a*, an application logic in the graphics engine 258 may be triggered. The application logic may react to the SCTE message 406*a*, utilizing any information specific to an embedded content in the SCTE message 406*a*. The application logic takes appropriate action to gather required additional information. Accordingly, the graphics engine 258 may present a user interface in the display view of the client device 108*a* for the user 118*a* for a selection to be made. The user manager 254 may gather real-time metadata, such as current geographical location, about the user 118*a* and may invoke an external service, such as a geographical positioning service, to get the metadata about to the user 118*a*. Such real-time metadata may also be encapsulated within the exemplary additional set of client request parameters 224*b* (FIG. 2A) that may be transmitted to the personalization system 126. It should be noted that the above instance of SCTE message as a form of the marker for facilitating the embedded trigger is merely for exemplary purposes and should not be construed to be limiting. Other forms of the marker, such as a manifest directive (tag), may also be implemented without deviating from the scope of the disclosure.

At 572, personalized media content may be determined based on the user interaction performed at the decision point. In accordance with an embodiment, the personalization system 126 may be configured to determine the personalized media content based on the user interaction performed at the decision point. In accordance with various embodiments, the personalization system 126, in conjunction with one or more of the media assets server 124, the CDS 128, and the media content master storage system 134, the SRU database 136, and the Ad decisioning servers 106, may be configured to determine the personalized media content.

In accordance with various examples, the personalized media content may correspond to additional programming media content or non-programming media content, a modified media content, or a programming media content referenced by an updated playback position within or outside the media content corresponding to the set of indexed disparate manifest units. For example, the additional programming media content may correspond to an alternate media content associated with one of the playlist of media content, such as a choose-your-own-adventure series, desired Ads or promotional content.

At 574, the differential programming schedule may be generated based on the determined personalized media content and the additional set of client request parameters provided in response to the user interaction performed at the decision point. In accordance with an embodiment, the personalization system 126 may be configured to generate the differential programming schedule based on the determined personalized media content and the additional set of client request parameters provided in response to the user interaction performed at the decision point. The differential programming schedule may thus correspond to the additional programming media content or non-programming media content (such as advertisements, graphics, overlays, promotional content, captions, alternate languages, and the like), modified media content, or alternate programming media content referenced by an updated playback position within or outside the media content corresponding to the set of indexed disparate manifest units.

In accordance with an embodiment, the differential programming schedule may be referred to as the second programming schedule 212*b* generated based on the user interaction at the decision point. As described earlier, the initial programming schedule may correspond to the first programming schedule 212*a* based on which the live output stream manifest (being currently played at the client device 108*a*) was generated. Thus, the differential programming schedule may be referenced as a delta programming schedule between the initial programming schedule and a branched programming schedule that comprises the personalized media content.

At 576, a branched programming schedule may be generated based on an integration of the differential programming schedule with the initial programming schedule. In accordance with an embodiment, the scheduler system 122 may be configured to generate the branched programming schedule based on the integration of the differential programming schedule, such as the second programming schedule 212*b*, with the initial programming schedule, such as the first programming schedule 212*a*. Thus, the scheduler system 122 may generate a unique branch of the initial programming schedule, such as the first programming schedule 212*a*, for the user 118*a*. In accordance with an embodiment, the scheduler system 122 may be configured to transmit the branched programming schedule, which corresponds to the first programming schedule 212*a* integrated with the second programming schedule 212*b*, to the publisher API 202 of the manifest manipulation system 130. Control passes to step 502 (FIG. 5A) for ingestion and received from step 516 (FIG. 5A) at step 578 (FIG. 5D).

At 578, a personalized live output stream manifest may be generated during subsequent iterations based on another event that corresponds to the receipt of the branched programming schedule. In accordance with an embodiment, the dynamic assembly pool 208 may be configured to generate the personalized live output stream manifest during subsequent iteration based on another event that corresponds to the receipt of the branched programming schedule, which may be the second programming schedule 212*b* stitched with the first programming schedule 212*a*. In other words, the personalized live output stream manifest may include altered, additional, rearranged, or replaced manifest units (corresponding to the differential programming schedule) inserted in the set of indexed disparate manifest units. Accordingly, in response to the subsequent client requests received from the player 256, the dynamic assembly pool 208 may be configured to generate the personalized live output stream manifest with altered, additional, rearranged, or replaced media content in the live output stream manifest.

At 580, additional personalized live output stream manifests may be generated based on different rearrangements of a sequence of manifest units corresponding to the retrieved set of indexed disparate manifest units and the altered, additional, rearranged, or replaced manifest units corresponding to the differential programming schedule. In accordance with an embodiment, the dynamic assembly pool 208 may be configured to generate the additional personalized live output stream manifests based on the different rearrangements of a sequence of manifest units corresponding to the retrieved set of indexed disparate manifest units and the altered, additional, rearranged, or replaced manifest units corresponding to the differential programming schedule.

Figure 6:
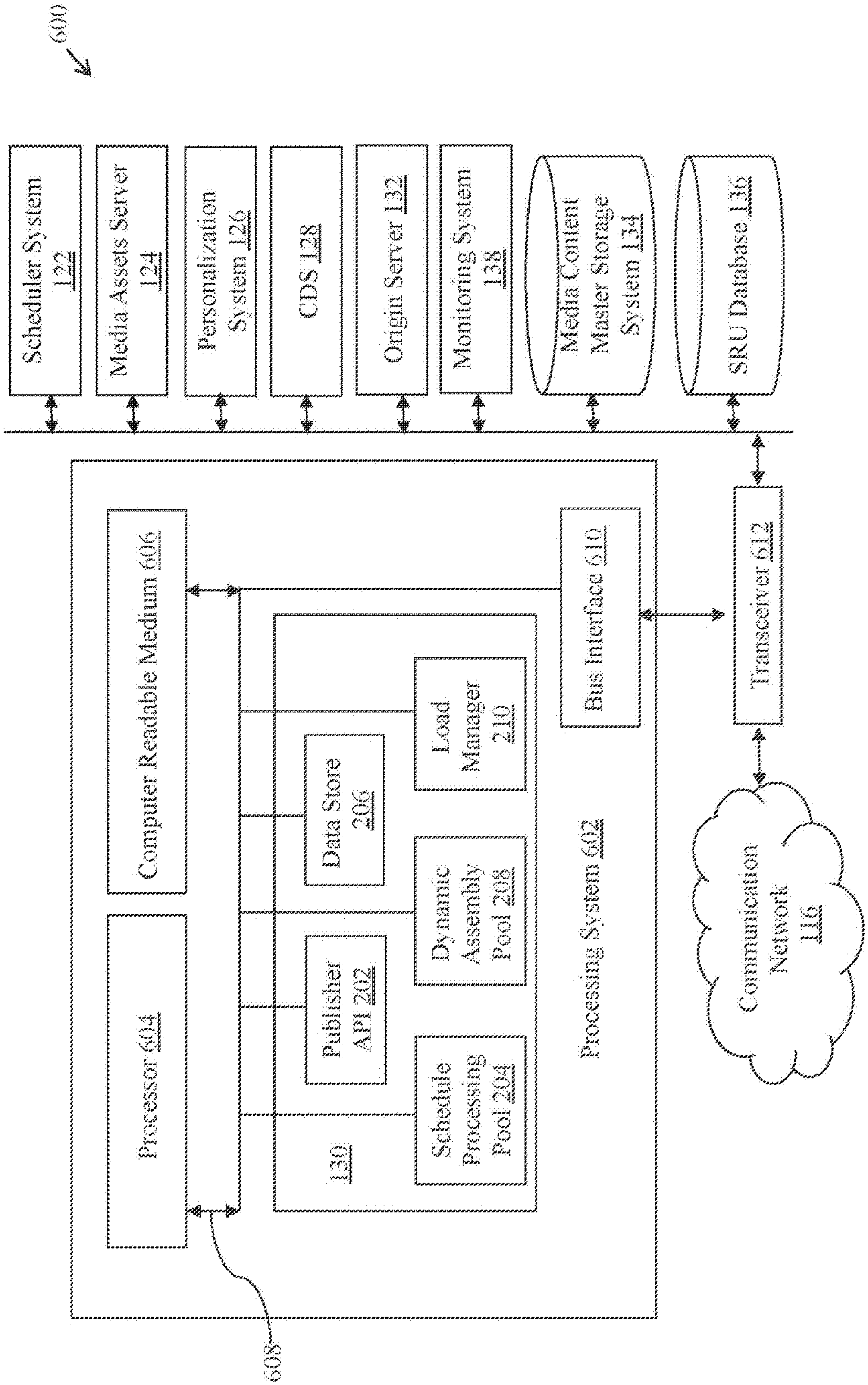
FIG. 6 is a conceptual diagram illustrating an example of a hardware implementation for the manifest manipulation system of FIG. 2A employing a processing system for generating a live output stream manifest based on an event, in accordance with an exemplary embodiment of the disclosure.

FIG. 6 is a conceptual diagram illustrating an example of a hardware implementation for the manifest manipulation system 130 of FIG. 2A employing a processing system for generating a live output stream manifest based on an event, in accordance with an exemplary embodiment of the disclosure. Referring to FIG. 6, the hardware implementation shown by a representation 600 for the manifest manipulation system 130 employs a processing system 602 for generating a live output stream manifest based on an event, in accordance with an exemplary embodiment of the disclosure, as described herein.

In some examples, the processing system 602 may comprise one or more hardware processors, such as a processor 604, a non-transitory computer-readable medium 606, a bus 608, a bus interface 610, and a transceiver 612. FIG. 6 further illustrates the processing system 602 comprising the publisher API 202, the schedule processing pool 204, the data store 206, the dynamic assembly pool 208, and the load manager 210, as described in detail in FIG. 2A.

The processor 604 may be configured to manage the bus 608 and general processing, including the execution of a set of instructions stored on the non-transitory computer-readable medium 606. The set of instructions, when executed by the processor 604, causes the manifest manipulation system 130 to execute the various functions described herein for any particular apparatus. The processor 604 may be implemented, based on a number of processor technologies known in the art. Examples of the hardware processor realized as the processor 604 may be a Reduced Instruction Set Computing (RISC) processor, an Application-Specific Integrated Circuit (ASIC) processor, a Complex Instruction Set Computing (CISC) processor, and/or other processors or control circuits.

The non-transitory computer-readable medium 606 may be used for storing data that is manipulated by the processor 604 when executing the set of instructions. The data is stored for short periods or in the presence of power. The non-transitory computer-readable medium 606 may also be configured to store data for one or more of the publisher API 202, the schedule processing pool 204, the data store 206, the dynamic assembly pool 208, and the load manager 210, as described in detail in FIG. 2A.

The bus 608 is configured to link together various circuits. In this example, the manifest manipulation system 130 employing the processing system 602 and the non-transitory computer-readable medium 606 may be implemented with bus architecture, represented generally by bus 608. The bus 608 may include any number of interconnecting buses and bridges depending on the specific implementation of the manifest manipulation system 130 and the overall design constraints. The bus interface 610 may be configured to provide an interface between the bus 608 and other circuits, such as, transceiver 612, and other devices in the media packaging and distribution system 102, such as the scheduler system 122, the media assets server 124, the personalization system 126, the CDS 128, the Origin server 132, the media content master storage system 134, the SRU database 136, and the monitoring system 138, as described in detail in FIG. 1.

The transceiver 612 may be configured to provide a communication of the manifest manipulation system 130 with various other external systems, such as the source devices 104, the plurality of Ad decisioning servers 106, the plurality of client devices 108 (associated with the plurality of users 118), the CDN 110, the external data sources 112, and the plurality of published data sources 114, via the communication network 116. The transceiver 612 may communicate via wireless communication with networks, such as the Internet, the Intranet and/or a wireless network, such as a cellular telephone network, a wireless local area network (WLAN) and/or a metropolitan area network (MAN). The wireless communication may use any of a plurality of communication standards, protocols and technologies, such as Global System for Mobile Communications (GSM), Enhanced Data GSM Environment (EDGE), Long Term Evolution (LTE), wideband code division multiple access (W-CDMA), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VOIP), and/or Wi-MAX.

It should be recognized that, in some embodiments of the disclosure, one or more components of FIG. 6 may include software whose corresponding code may be executed by at least one processor, for across multiple processing environments. For example, the publisher API 202, the schedule processing pool 204, the data store 206, the dynamic assembly pool 208, and the load manager 210 may include software that may be executed across a single or multiple processing environments.

In an aspect of the disclosure, the processor 604, the non-transitory computer-readable medium 606, or a combination of both may be configured or otherwise specially programmed to execute the operations or functionality of the publisher API 202, the schedule processing pool 204, the data store 206, the dynamic assembly pool 208, and the load manager 210, or various other components described herein, as described with respect to FIG. 2A.

Various embodiments of the disclosure comprise the manifest manipulation system 130 that may be configured to generate a live output stream manifest based on an event. The manifest manipulation system 130 may comprise, for example, the publisher API 202, the schedule processing pool 204, the data store 206, the dynamic assembly pool 208, and the load manager 210. In accordance with an embodiment, one or more processors in the manifest manipulation system 130 may be configured to ingest a portion of a programming schedule comprising a playlist of media content. The one or more processors in the manifest manipulation system 130 may be further configured to obtain the collection of disparate manifest units 218 based on processing of a source manifest, such as the source manifest 216, encapsulated by the playlist of media content. The one or more processors in the manifest manipulation system 130 may be further configured to store the collection of disparate manifest units 218 as indexed disparate manifest units in a data store 206 based on a set of index parameters. The one or more processors in the manifest manipulation system 130 may be further configured to generate a live output stream manifest, such as the exemplary live output stream manifest 222*a*, during a current iteration based on an event including the set of indexed disparate manifest units 220 retrieved from the data store 206 in response to a client request comprising a set of client request parameters. The retrieval of the set of indexed disparate manifest units 220 from the data store 206 may be performed just-in-time based on a query that corresponds to the set of client request parameters associated with the client request.

In accordance with an embodiment, the event, in response to which the live output stream manifest, such as the exemplary live output stream manifest 222*a*, is generated, may correspond to a receipt of the first programming schedule 212*a*, the second programming schedule 212*b*, or a user input at a client device, such as the client device 108*a*. The first programming schedule 212*a* and the second programming schedule 212*b* may correspond to at least two categories of the programming schedule. The first programming schedule 212*a* may correspond to an initial programming schedule. The second programming schedule 212*b* may correspond to a differential programming schedule is generated based on a user interaction at a decision point. The decision point may be encountered by a player, such as the player 256, at the client device, such as the client device 108*a*, during a playout of the current iteration of the live output stream manifest. The decision point corresponding to a manifest directive in a disparate manifest unit may be defined by a programming indicator, an interactive element, a non-programming indicator, and/or a programming media content marker.

In accordance with an embodiment, the differential programming schedule may correspond to additional programming media content or non-programming media content, a modified media content, or an alternate programming media content referenced by an updated playback position within or outside the playlist of media content corresponding to the set of indexed disparate manifest units 220.

In accordance with an embodiment, additional client request parameters may be received or inferred from the client device 108*a* in response to the user interaction performed at the decision point. The additional client request parameters may comprise additional information and a live media output stream identifier associated with the live output stream manifest, such as the exemplary live output stream manifest 222*a*. The differential programming schedule may be generated based on the additional client request parameters.

In accordance with an embodiment, the one or more processors in the manifest manipulation system 130 may be further configured to receive a branched programming schedule that is generated based on an integration of the differential programming schedule with the first programming schedule 212*a* for the client device 108*a*. The one or more processors in the manifest manipulation system 130 may be further configured to generate a personalized live output stream manifest, such as the exemplary personalized live output stream manifest 222*b*, during a subsequent iteration based on another event that corresponds to the receipt of the branched programming schedule. Altered or additional manifest units corresponding to the differential programming schedule may be inserted in or appended to the set of indexed disparate manifest units 220.

In accordance with an embodiment, the one or more processors in the manifest manipulation system 130 may be further configured to generate additional live output stream manifests based on different rearrangements of a sequence of the retrieved set of indexed disparate manifest units 220.

In accordance with an embodiment, the one or more processors in the manifest manipulation system 130 may be further configured to generate additional personalized live output stream manifests based on different rearrangements of a sequence of manifest units corresponding to the retrieved set of indexed disparate manifest units 220 and the altered or the additional manifest units corresponding to the differential programming schedule.

In accordance with an embodiment, the one or more processors in the manifest manipulation system 130 may be further configured to publish the live output stream manifest, such as the exemplary live output stream manifest 222*a*, during the current iteration to a content delivery network, i.e. the CDN 110.

In accordance with an embodiment, the one or more processors in the manifest manipulation system 130 may be further configured to transmit the live output stream manifest, such as the exemplary live output stream manifest 222*a*, to a client device, i.e. the client device 108*a*, in a sequence defined in the programming schedule, the set of client request parameters, and/or the set of indexing parameters. The disparate manifest units from the set of indexed disparate manifest units may be transmitted in entirety or one-by-one during the current iteration.

In accordance with an embodiment, the one or more processors in the manifest manipulation system 130 may be further configured to receive an updated client request associated with a live media output stream identifier when the live output stream manifest, such as the exemplary live output stream manifest 222*a*, is played out at the client device 108*a*. The one or more processors in the manifest manipulation system 130 may be further configured to retrieve, in response to the updated client request, a new indexed disparate manifest units from the data store 206 based on an updated query that corresponds to an updated set of client request parameters. The one or more processors in the manifest manipulation system 130 may be further configured to generate an updated live output stream manifest during a subsequent iteration based on the set of indexed disparate manifest units 220 and the new indexed disparate manifest units retrieved from the data store 206. The updated live output stream manifest may be maintained in a manifest window that corresponds to a number of manifest segments that the player 256 can buffer. The manifest window may be inferred or defined by the initial client request and/or the updated client request. The initial client request and the updated client request may correspond to the first programming schedule 212*a*.

In accordance with an embodiment, the new indexed disparate manifest units may be continually added to the set of indexed disparate manifest units 220 in the manifest window during subsequent iterations.

In accordance with an embodiment, the new indexed disparate manifest units may replace older manifest units from the set of indexed disparate manifest units 220 in the manifest window during subsequent iterations such that size of the manifest window remains as defined or inferred based on the initial client request and/or the updated client request.

In accordance with an embodiment, the programming schedule may further comprise a start time of each media content, a live media output stream identifier, and additional playout parameters. The set of indexing parameters may comprise a scheduled playout time, multiple live media output stream identifiers defined in the programming schedule, and a sequence of the collection of the disparate manifest units 218 defined in the source manifest 216. The set of client request parameters may comprise a live media output stream identifier, a playout time, a manifest window size, and a type of live output stream manifest.

In accordance with an embodiment, the playlist of media content may correspond to pre-encoded media assets and/or live input streams. A manifest unit from the collection of the disparate manifest units may comprise a referenced media segment, an associated manifest directive or multiple manifest directives, and a manifest unit header.

In accordance with an embodiment, the one or more processors in the manifest manipulation system 130 may be further configured to assign a playout time parameter and a time-to-live parameter to each disparate manifest unit when stored in the data store 206. The playout time parameter may be relative to a position of a corresponding referenced media segment and a start time of each media content as defined in the programming schedule. The time-to-live parameter may be relative to an end time of each media content defined in the programming schedule.

Various embodiments of the disclosure may provide a computer-readable medium, such as the non-transitory computer-readable medium 606, having stored thereon, computer implemented instruction that when executed by the processor 604 causes the manifest manipulation system 130 to execute operations for generating a live output stream manifest based on an event. In accordance with an embodiment, the processor 604 causes the manifest manipulation system 130 to execute operations to ingest a portion of a programming schedule comprising a playlist of media content. The processor 604 causes the manifest manipulation system 130 to obtain the collection of disparate manifest units 218 based on processing of the source manifest 216 encapsulated by the playlist of media content. The processor 604 causes the manifest manipulation system 130 to store the collection of disparate manifest units 218 as indexed disparate manifest units in a data store 206 based on a set of index parameters. The processor 604 causes the manifest manipulation system 130 to generate a live output stream manifest, such as the exemplary live output stream manifest 222*a*, during a current iteration based on an event including a set of indexed disparate manifest units 220 retrieved from the data store 206 in response to a client request comprising a set of client request parameters. The retrieval of the set of indexed disparate manifest units 220 from the data store 206 is performed just-in-time based on a query that corresponds to the set of client request parameters associated with the client request.

The proposed system and method for transmitting a live output stream manifest based on an event may be highly advantageous over the existing systems. As described above, upon scheduling, a media content may be deconstructed into corresponding internal media segments and grouped by the reference media as disparate manifest units. Each manifest unit, comprising multiple manifest directives but only one referenced media segment, may be persisted to a cache, such as the data store 206, Each manifest unit may be indexed according to the live media output stream identifier as well as the corresponding playout time of the media segment per the initial programming schedule and sequence of the media segment in the main source manifest. Once stored in the data store 206, only step required to transmit a live output stream manifest may be to retrieve the desired manifest units from the data store 206 and return them as-is. Such a simple design model may provide numerous advantageous over the existing systems.

For example, the only just-in-time action needed for the proposed system is the querying of the desired manifest units from the data store 206 and then transmitting a live output stream manifest, such as the exemplary live output stream manifest 222*a*, to the plurality of client devices 108 as-is. This is an extremely low-resource operation. Further, the generation of the live output stream manifest, such as the exemplary live output stream manifest 222*a*, may be based on one or more events, such as receipt of a branching programming schedule, in contrast to time-based existing systems. The live output stream manifest, such as the exemplary live output stream manifest 222*a*, exists only when it is being requested and the stitching decisions are mostly made in advance of playout, as opposed to real-time stitching in the existing systems which must be consistently processed whether it has viewers or not. Thus, the system load becomes directly dependent to number of requests rather than number of live output stream manifests. Said differently, resource utilization by the live output stream manifest, such as the exemplary live output stream manifest 222*a*, can be completely tied to number of viewers currently consuming that live output stream manifest, less the costs of data storage, thereby having a dramatic effect on the number of resources utilized. As, the stitching is performed only when the live media output stream, such as the exemplary live output stream manifest 222*a*, is to be viewed, such simplicity of the design model may extraordinarily optimize the resource utilization. Accordingly, the proposed system and method exhibits quite low usage of resources, for example reduced processing and storage consumption. Further, as any latency can be directly correlated to the latency of a data store request, which is typically an order of magnitude or more performant than the decision-making and real-time stitching per the existing systems, the proposed system and method is enormously efficient for transmitting the live output stream manifest, such as the exemplary live output stream manifest 222*a*, in response to the client requests, such as initial, updated, or additional client requests.

Even the personalization of the live media output streams may incur zero or nearly-zero additional resource costs and may be performed on-the-fly. The reduction of the resource costs and system workload for the personalized live media output streams may be attributed to the differential programming schedules due to which only the delta manifest units, which are unique to the personalized live media output stream, are additionally stored in the data store 206. The delta manifest units are stitched with the already stored manifest units of the parent live output stream manifests to provide the personalized live media output stream manifest, such as the exemplary personalized live output stream manifest 222*b*, when an event occurs, such as branched programming schedule received in response to the additional client request. Hence, the processing resource usage may be identical to non-personalized, generic live media output streams, and further stitched only when being viewed, thus providing unprecedent scalability and optimized (or minimal) resource consumption of the overall proposed system on the server-side.

Further, the simplicity of the design process adopted by the proposed system and method for the generation of the live output stream manifests based on an event may provide a significant intrinsic benefit of reducing errors in the live output stream manifests. The only errors that may occur may be the ones within one or more of the disparate manifest units, as opposed to the entire live output stream manifest with real-time stitching being infected by a single error, in accordance with the existing systems. Thus, the proposed system and method exhibits reduced probability for error due to smaller, testable manifest units.

Further, the proposed system and method for the generation of the live output stream manifests based on an event creates the disparate manifest units and stores ahead of a scheduled playout. Time-based storage of the manifest units allows for simple time shifting to past and future programming media content. This may allow for validating any permutation of a resulting live output stream manifest, such as the exemplary live output stream manifest 222*a*, far before scheduled playout would occur, without additional resource utilization. Effectively, every permutation of a live output stream manifest, such as the exemplary live output stream manifest 222*a*, may be based on media content may be realized as a response to a client request with a simple query to the data store 206 (rather than real-time evaluation and "stitching" of the media content, per the existing systems). For example, returning a 10-minute manifest window (number of manifest segments for the player to buffer) versus a 5-minute manifest window, is just the results of the number of manifest units returned from the data store query. This gives an ample opportunity to take any corrective measures before the live output stream manifest, such as the exemplary live output stream manifest 222*a*, is consumed by the plurality of client devices 108 and further helps guarantee both the availability as well as smooth playout of the live media output stream, such as the exemplary live output stream manifest 222*a*, on the client-side.

Apart from the above, there may be certain scenarios in which no additional processing or storage may be required and the resource utiization is identical to the originally intended live output stream manifest's utilization. For example, live media segment assets, or "live clips" may simply be the result of a smaller number of manifest units returned as a VOD. In another example, time-shifted live output stream manifests may also be enabled in the similar manner where past or even future scheduled media content may be played out per client request.

As utilized herein the terms "circuits" and "circuitry" refer to physical electronic components (for example, hardware) and any software and/or firmware ("code") which may configure the hardware, be executed by the hardware, and/or otherwise be associated with the hardware. As used herein, for example, a particular processor and memory may comprise a first "circuit" when executing first one or more lines of code and may comprise a second "circuit" when executing second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and/or code (if any is necessary) to perform the function, regardless of whether performance of the function is disabled, or not enabled, by some user-configurable setting.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in a number of different forms, which have been contemplated to be within the scope of the claimed subject matter. In addition, for each of the embodiments described herein, the corresponding form of any such embodiments may be described herein as, for example, "logic configured to" perform the described action.

Another embodiment of the disclosure may provide a non-transitory machine and/or computer readable storage and/or media, having stored thereon, a machine code and/or a computer program having at least one code section executable by a machine and/or a computer, thereby causing the machine and/or computer to perform the steps as described herein for generating a live output stream manifest based on an event.

The present disclosure may also be embedded in a computer program product, which comprises all the features enabling the implementation of the methods described herein, and which when loaded in a computer system is able to carry out these methods. Computer program in the present context means any expression, in any language, code or notation, either statically or dynamically defined, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithms, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, physical and/or virtual disk, a removable disk, a CD-ROM, virtualized system or device such as a virtual servers or container, or any other form of storage medium known in the art. An exemplary storage medium is communicatively coupled to the processor (including logic/code executing in the processor) such that the processor can read information from, and write information to, the storage medium. In the alternative, the storage medium may be integral to the processor.

While the present disclosure has been described with reference to certain embodiments, it will be noted understood by, for example, those skilled in the art that various changes and modifications could be made and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated. Therefore, it is intended that the present disclosure is not limited to the particular embodiment disclosed, but that the present disclosure will include all embodiments falling within the scope of the appended claims.

What is claimed is:

1. A system, comprising:

a memory for storing instructions; and one or more processors for executing the instructions to perform operations, the operations comprising:

obtaining a portion of a programming schedule that defines a playlist of media content for playout;

obtaining a collection of disparate manifest units from a source manifest encapsulated by the playlist of media content; and storing the collection of disparate manifest units as a plurality of indexed disparate manifest units in a data store based on a set of indexing parameters that enable an event-based generation of a live output stream manifest, wherein:

(i) the playlist of media content corresponds to one or more pre-encoded media assets or live input streams, (ii) a manifest unit from the collection of the disparate manifest units comprises a referenced media segment indicative of a path to a media segment comprising a portion of media content from the one or more pre-encoded media assets or live input streams, (iii) the manifest unit is assigned a playout time parameter and a time-to-live parameter, (iv) the playout time parameter is relative to a position of the referenced media segment and a start time of the media content as defined in the programming schedule, and (v) the time-to-live parameter is relative to an end time of the media content in the programming schedule.

2. The system of claim 1, wherein obtaining the collection of disparate manifest units from the source manifest encapsulated by the playlist of media content comprises:

obtaining the source manifest based on the portion of the programming schedule; and deconstructing one or more HTTP Live Streaming directive within the source manifest to obtain the collection of disparate manifest units.

3. The system of claim 1, wherein the operations further comprise:

initiating a generation of a live output stream manifest based on the plurality of indexed disparate manifest units, wherein the live output steam manifest is published to a content delivery network.

4. The system of claim 1, wherein the data store comprises a temporary storage system and is configured to persist the plurality of indexed disparate manifest units until a specified expiration date that is based on the time-to-live parameter.

5. The system of claim 1, wherein the set of indexing parameters comprises the playout time parameter, the time-to-live parameter, and a live media output stream identifier.

6. The system of claim 3, wherein the live output stream manifest is generated in response to a client request that originates from a client player.

7. The system of claim 6, wherein the client request is associated with a manifest window size and the live output stream manifest is generated using a subset of the plurality of indexed disparate manifest units based on the manifest window size.

8. The system of claim 7, wherein the live output stream manifest comprises a set number of manifest units that rotate with playout of a corresponding live output stream and the set number of manifest units is based on the manifest window size.

9. The system of claim 7, wherein the content delivery network is configured to cache the live output stream manifest for a target duration based on the manifest window size.

10. The system of claim 7, wherein the manifest window size is based on a player buffer of a media player of the client device.

11. A computer-implemented method, comprising:

obtaining, by one or more processors, a portion of a programming schedule that defines a playlist of media content for playout;

obtaining, by one or more processors, a collection of disparate manifest units based on processing of a source manifest encapsulated by the playlist of media content; and storing, by one or more processors, the collection of disparate manifest units as a plurality of indexed disparate manifest units in a data store based on a set of indexing parameters that enable an event-based generation of a live output stream manifest, wherein:

(i) the playlist of media content corresponds to one or more pre-encoded media assets or live input streams, (ii) a manifest unit from the collection of the disparate manifest units comprises a referenced media segment indicative of a path to a media segment comprising a portion of media content from the one or more pre-encoded media assets or live input streams, (iii) the manifest unit is assigned a playout time parameter and a time-to-live parameter, (iv) the playout time parameter is relative to a position of the referenced media segment and a start time of the media content as defined in the programming schedule, and (v) the time-to-live parameter is relative to an end time of the media content in the programming schedule.

12. One or more non-transitory computer-readable storage media including instructions that, when executed by one or more processors, cause the one or more processors to:

obtaining a portion of a programming schedule that defines a playlist of media content for playout;

obtaining a collection of disparate manifest units based on processing of a source manifest encapsulated by the playlist of media content; and storing the collection of disparate manifest units as a plurality of indexed disparate manifest units in a data store based on a set of indexing parameters that enable an event-based generation of a live output stream manifest, wherein:

(i) the playlist of media content corresponds to one or more pre-encoded media assets or live input streams, (ii) a manifest unit from the collection of the disparate manifest units comprises a referenced media segment indicative of a path to a media segment comprising a portion of media content from the one or more pre-encoded media assets or live input streams, (iii) the manifest unit is assigned a playout time parameter and a time-to-live parameter, (iv) the playout time parameter is relative to a position of the referenced media segment and a start time of the media content as defined in the programming schedule, and (v) the time-to-live parameter is relative to an end time of the media content in the programming schedule.

* * * * *